(12) United States Patent
Kim et al.

(10) Patent No.: US 12,329,607 B2
(45) Date of Patent: Jun. 17, 2025

(54) SURGICAL TOOL SET FOR IMPLANT

(71) Applicant: TRUABUTMENT KOREA, INC., Bucheon-si (KR)

(72) Inventors: HaengOh Kim, Busan (KR); HoSu Lee, Busan (KR)

(73) Assignee: TRUABUTMENT KOREA, INC., Bucheon-si (KR)

(*) Notice: Subject to any disclaimer, the term of this patent is extended or adjusted under 35 U.S.C. 154(b) by 98 days.

(21) Appl. No.: 17/480,605

(22) Filed: Sep. 21, 2021

(65) Prior Publication Data

US 2023/0000599 A1    Jan. 5, 2023

(30) Foreign Application Priority Data

Jul. 2, 2021  (KR) .................. 10-2021-0087045

(51) Int. Cl.
*A61C 8/00* (2006.01)
(52) U.S. Cl.
CPC .................. *A61C 8/0089* (2013.01)
(58) Field of Classification Search
CPC ...................................... A61C 8/0089
See application file for complete search history.

(56) References Cited

U.S. PATENT DOCUMENTS

| | | | | |
|---|---|---|---|---|
| 8,029,282 | B2 * | 10/2011 | Carter ................ | A61C 8/0089 433/163 |
| 2011/0306009 | A1 * | 12/2011 | Suttin ................ | A61C 8/009 433/75 |
| 2013/0244204 | A1 * | 9/2013 | Magnusson ......... | A61C 8/0066 433/173 |
| 2015/0265372 | A1 * | 9/2015 | Kim .................... | A61C 13/08 433/214 |
| 2017/0151038 | A1 * | 6/2017 | Fan .................... | A61C 8/0074 |
| 2019/0290404 | A1 * | 9/2019 | Thomke ............. | A61C 8/0089 |
| 2021/0386513 | A1 * | 12/2021 | Kofron ............... | A61C 1/084 |

FOREIGN PATENT DOCUMENTS

| | | |
|---|---|---|
| CN | 104812331 A | 7/2015 |
| JP | 2000-512883 A | 10/2000 |
| KR | 20-0412097 Y1 | 3/2006 |
| KR | 10-0921671 B1 | 10/2009 |
| KR | 10-2014-0067030 A | 6/2014 |
| KR | 10-2017-0013678 A | 2/2017 |
| KR | 10-1834765 B1 | 3/2018 |
| WO | WO 2013/037730 A1 | 3/2013 |

* cited by examiner

*Primary Examiner* — Cris L. Rodriguez
*Assistant Examiner* — Sydney J Pulvidente
(74) *Attorney, Agent, or Firm* — NSIP Law

(57) ABSTRACT

Disclosed herein a surgical tool set for implant having an implantation driver for implanting a fixture. The implantation driver comprising: a first supporting portion disposed radially in an engagement portion that transmits implantation torque to the fixture; and at least one second supporting portion that is disposed radially in the engagement portion so as to be spacedly apart from the first supporting portion and is arranged asymmetrically with respect to a center point located on a central axis of the implantation driver. The second supporting portion has a larger size than the first supporting portion along at least one of an outer circumference direction and a radial direction of the engagement portion.

11 Claims, 16 Drawing Sheets

SURGICAL TOOL SET FOR IMPLANT

CROSS REFERENCE TO RELATED APPLICATION

The present application claims priority to Korean Patent Application No. 10-2021-0087045, filed Jul. 2, 2021, the entire contents of which is incorporated herein for all purposes by this reference.

BACKGROUND OF THE INVENTION

1. Field of the Invention

The present disclosure relates to a surgical tool set for implant, and more particularly, to a surgical tool set for implant for implanting a fixture in a jawbone so that the fixture may have a preset position and alignment direction.

2. Description of the Related Art

Generally, implant is composed of a fixture implanted in an alveolar bone, an abutment inserted and fixed in the fixture, and a prosthesis bonded to cover an upper part of abutment.

A fixture, which is implanted in an alveolar bone, plays the role of tooth root, a prosthesis is made in a tooth-like shape to become the visible part of artificial tooth, and an abutment fixes a prosthesis to a fixture so that loads on the prosthesis are transmitted to the fixture and the alveolar bone.

A final prosthesis should have a size and structure naturally engaging with the residual teeth of a patient in both functional and aesthetic aspects. To this aim, a patient's alveolar bone model is used, and proper prosthetic treatment is needed for each patient. Herein, the model includes a fixture. In addition, such proper prosthetic treatment may be digitally implemented based on a digital model for a patient's alveolar bone in which a fixture is already disposed or not yet. In addition, a prefab abutment may be modified to fit into the shapes of soft gums and teeth. Thus, similar to an interface between a fixture and an alveolar bone, there may be an abutment-fixture interface in which an abutment should be positioned unilaterally for a fixture. When an abutment is fabricated to be positioned in a desired rotational relation for one or all the alveolar bones including a fixture and a neighboring tooth, it may be ensured that a practitioner couples the abutment to the fixture or a specific part of alveolar bone in an exact rotational direction or in an exact alignment position.

A digital model to be used in an actual procedure may be implemented by a 3D simulation surgery program that simulates a patient's oral structure, a fixture and an abutment, which are applied to a surgery spot in mouth, and an alignment of tools to be used for the procedure. To align an abutment in a desired position, a fixture needs to be aligned in a specific position or direction in an alveolar bone. For that, a surgery program sets coordinates for a simulated oral structure and a surgery spot and may determine a coordinate in which a fixture and a tool (e.g., sleeve) are located in the surgery spot. A surgery program may construct a library of location coordinates of fixtures and tools and may provide a practitioner with a virtual model showing a location coordinate and/or alignment position and direction between fixtures and tools in a surgery spot.

A practitioner may receive an abutment and an artificial tooth as a single integrated unit or as separate components to be assembled in a patient's mouth. A practitioner who wants to use an abutment and an artificial tooth for a patient needs to recognize initial and final alignment positions according to implantation of a fixture and the rotational orientation of the abutment for the fixture beforehand in order to obtain an alignment intended by an implant manufacturer. For that, through the surgery program, the practitioner should not only identify an initial position of a fixture to be implanted and a final position of an implanted fixture but also recognize an arrangement relation of surgical tools to be used for implantation. However, the existing surgical tools do not provide any function to identify an alignment position or direction of a fixture or a relative arrangement relation between multiple tools. Accordingly, in case the practitioner places a fixture by means of an existing surgical tool, considerable difficulty may occur in exactly aligning the fixture in a specific position according to a relative positional relation between the fixture and the tool, which is set by the surgery program.

SUMMARY OF INVENTION

A technical object of the present disclosure is to provide a surgical tool set for implant for implanting a fixture in a jawbone so that the fixture may have a preset position and alignment direction.

The objects of the present invention are not limited to the above-mentioned objects, and other objects not mentioned can be clearly understood by those skilled in the art from the following description.

According to the present disclosure, there is provided a surgical tool set for implant having an implantation driver for implanting a fixture, the implantation driver comprising: a first supporting portion disposed radially in an engagement portion that transmits implantation torque to the fixture; and at least one second supporting portion that is disposed radially in the engagement portion so as to be spacedly apart from the first supporting portion and is arranged asymmetrically with respect to a center point located on a central axis of the implantation driver. The second supporting portion has a larger size than the first supporting portion along at least one of an outer circumference direction and a radial direction of the engagement portion.

According to the embodiment of the present disclosure in the surgical tool set for implant, when there is a plurality of the first supporting portions, the first supporting portions may be disposed at an equal interval along the outer circumference direction and the second supporting portion may be disposed between the first supporting portions. The second supporting portion along the outer circumference direction may have a larger size than an outer circumference size virtually connecting the first supporting portions that are adjacent to each other.

According to the embodiment of the present disclosure in the surgical tool set for implant, the first supporting portion may comprise a first supporting end located at a side end facing the fixture. The second supporting portion may comprise a second supporting end at a side end facing the fixture, and the first and second supporting ends may be formed to have a same level.

According to the embodiment of the present disclosure in the surgical tool set for implant, the implantation driver may further comprise a recognition portion that is provided on the engagement portion and identifies at least one of an alignment position of the fixture and an alignment direction of the fixture.

According to the embodiment of the present disclosure in the surgical tool set for implant, the recognition portion may comprise a position identification portion that is arranged to correspond to the second supporting portion and identify at least one of the alignment position and the alignment direction and a plurality of dummy portions that are disposed spacedly from the position identification portion. The position identification portion may have a larger size than the dummy portions along at least one of an outer circumference direction and a radial direction of the recognition portion.

According to the embodiment of the present disclosure in the surgical tool set for implant, the surgical tool set further may comprise a sleeve configured to support the fixture and guide the fixture to a jawbone, when the fixture is implanted. The sleeve may comprise: a body portion that the fixture penetrates; and an alignment mark portion that is disposed around the body portion and provides a reference point for at least one of the alignment position and the alignment direction, the recognition portion may comprises: the alignment identification portion that is disposed between one side of the position identification portion and the dummy portion and has a check area, in which the alignment mark portion is recognizable when the fixture is implanted using the implantation driver; and an auxiliary identification portion that is disposed between the other side of the position identification portion and the dummy portion and is formed to have a smaller size than the check area of the alignment identification portion.

According to the embodiment of the present disclosure in the surgical tool set for implant, the sleeve may have a plurality of connecting portions that are disposed around the body portion to be mounted into a guide hole of a guide device exposing an implantation position of the fixture during the implantation. The alignment mark portion may be provided to one of plurality of the connecting portions.

According to the embodiment of the present disclosure in the surgical tool set for implant, the connecting portion, to which the alignment mark portion is provided, may be mounted into an end of the guide hole corresponding to an outer gum.

According to the embodiment of the present disclosure in the surgical tool set for implant, the surgical tool set further may comprise an engagement structure mounting tool configured to mount a fixture engagement structure on the implanted fixture. The engagement structure mounting tool may comprise: a rod configured to penetrate the fixture engagement structure; and a fastening portion that is disposed at an end of the rod and is combined with an inner fastening portion of the fixture when the fixture engagement structure is mounted.

According to the embodiment of the present disclosure in the surgical tool set for implant, the fixture may comprise area a first fixture alignment portion and a second fixture alignment portion that have a structure for engaging with the first supporting portion and the second supporting portion in an area section corresponding to the engagement portion. The fixture engagement structure may comprise, in the engagement area section, a first engagement structure alignment portion and a second engagement structure alignment portion that have a same structure as the first supporting portion and the second supporting portion.

The features briefly summarized above for this disclosure are only exemplary aspects of the detailed description of the disclosure which follow, and are not intended to limit the scope of the disclosure.

According to the present disclosure, a surgical tool set for implant may be provided for implanting a fixture in a jawbone so that the fixture may have a preset position and alignment direction.

In addition, no effect is excluded which may be derived from a configuration that those skilled in the art are able to understand through the present specification.

DETAILED DESCRIPTION OF THE INVENTION

Figure 1:
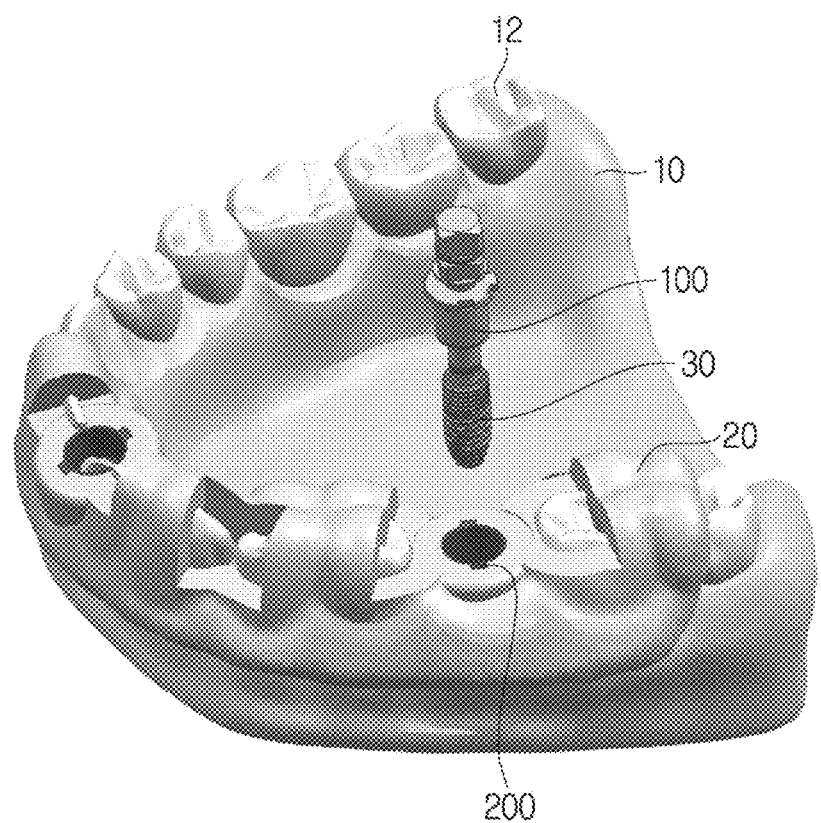
FIG. 1 is a perspective view showing implantation of a fixture using a surgical tool set for implant according to the present disclosure.

Hereinafter, embodiments of the present disclosure will be described in detail with reference to accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, the terms such as first and second are used only for the purpose of distinguishing one component from another, and do not limit the order or importance of components and the like unless specifically stated otherwise. Thus, within the scope of this disclosure, a first component in one embodiment may be referred to as a second component in another embodiment, and similarly a second component in one embodiment may be referred to as a first component.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Hereinafter, exemplary embodiments of the present invention will be described in detail with reference to the accompanying drawings and the contents described below. However, the present invention is not limited to the embodiments described herein and may be embodied in other forms. Rather, the embodiments introduced herein are provided to ensure that the disclosed subject matter is thorough and complete, and that the scope of the invention will be fully conveyed to those skilled in the art. Like numbers refer to like elements throughout. Meanwhile, the terminology used herein aims to describe particular embodiments only and is not intended to limit the present invention. In this specification, the singular forms also include the plural unless specifically stated otherwise in the text. As used herein, "comprises" and/or "comprising" specifies the presence of the mentioned shapes, numbers, steps, actions, members and/or elements. It does not exclude the presence or addition of one or more other shapes, numbers, steps, actions, members, elements and/or groups thereof.

In addition, expressions of location relations used in the present specification such as "upper", "lower", "left" and "right" are employed for the convenience of explanation, and in case drawings illustrated in the present specification are inversed, the location relations described in the specification may be inversely understood.

Hereinafter, referring to FIGS. 1 to 9, a surgical tool set for implant according to the present disclosure will be described.

FIG. 1 is a perspective view showing implantation of a fixture using a surgical tool set for implant according to the present disclosure.

A surgical tool set for implant may include: an implantation driver 100 for implanting a fixture 30 in a mouth having a gum 10 and a tooth 12, a guide device 20 equipped with a guide hole that exposes an implantation position of the fixture 30 in a patient's mouth, and a sleeve 200 that is installed in the guide hole and supports and guides the fixture 30 to a jawbone during implantation by means of the implantation driver. For example, the guide device may be a surgical guide, and the guide hole may be a round hole disposed around the sleeve 200 installed in the guide device 20 in FIG. 1.

Figure 2:
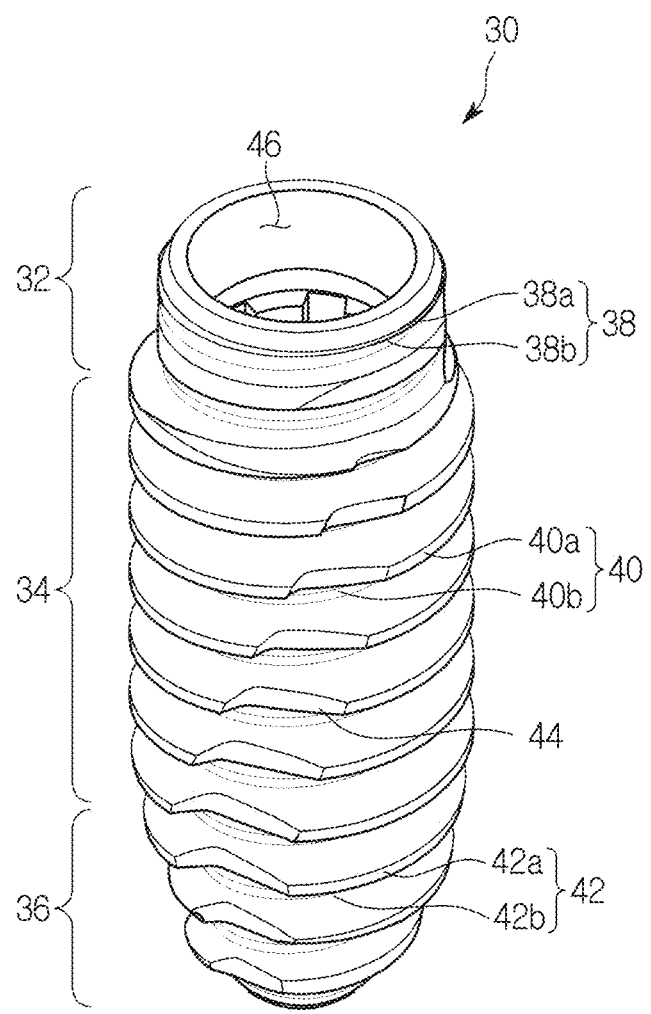
FIG. 2 is a perspective view of fixture.

Before a surgical tool set is described, the fixture 30 will be described which is implanted in a desired alignment position and/or alignment direction at a surgery spot in a mouth by means of the set. FIG. 2 is a perspective view of fixture, and FIG. 3 is a partial exploded perspective view of fixture.

Figure 3:
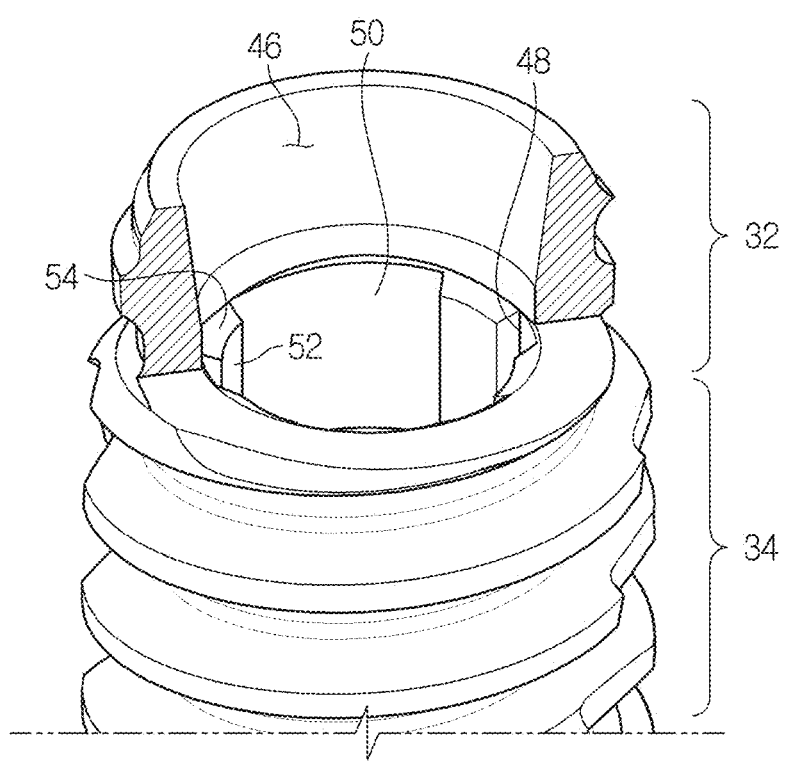
FIG. 3 is a partial exploded perspective view of fixture.

Referring to FIG. 2 and FIG. 3, the fixture 30 may be used as a securing element of a dental prosthesis. For that, the fixture 30 may be inserted into a bore hole that is already formed in the bone tissue of alveolar bone in a position in which a dental prosthesis is required. A dental fixture may be normally rotated into a bore hole. In the case of a threaded fixture, a female screw may be formed in a bore hole, or no thread may be formed in the bore hole. In this case, for example, the fixture 30 may have self-tapping capability by providing one or more cutting recesses, edges or notches, which extend in an axial direction, to the thread of the fixture 30. For example, an apical end of the fixture 30 may have two to four cutting recesses. Of course, it is possible to consider other numbers of cutting recesses.

The fixture 30 may form a dental implant by being inserted into bone tissue composed of cortical bone and cancellous bone. The fixture 30 has an approximately cylindrical shape, and a spiral ridge portion may be formed on the outer circumferential surface. When the fixture 30 is rotated along a central axis, the fixture 30 is inserted into cortical bone and cancellous bone and may be implanted by forming a thread groove on an inner circumferential surface of a bore hole that is already prepared in bone tissue by means of a drill. Herein, titanium is normally used as a material of the fixture 30, but other types of metal materials may be used as long as no rejection occurs in human body.

The fixture 30 may include a first area section 32, which corresponds to a cortical bone during the implantation of bone tissue, a second area section 34, which corresponds to a cancellous bone during the implantation, a third area section 36 that is disposed by being tapered under the second area section 34, a cutting portion 44 intersecting the second area section 34 and the third area section 36, and a receiving portion 46 in which a screw (refer to 90 in FIG. 13E) is coupled to the bottom of a fixture engagement structure 60.

The first area section 32 is a part that is mostly inserted into cortical bone, when the fixture 30 is inserted. Although the first area section 32 is an upper part of the fixture 30, a part of the lower part of the first area section 32 may be implanted in a cancellous bone. The first area section 32 may have a plurality of first thread portions 38 that have a first ridge portion 38a, which is machined in a spiral shape on an outer circumferential surface, and a first bottom portion 38b, which is formed with a smaller radius of central axis (radius tending in a radial direction from the central axis of the fixture 30). The first ridge portion 38a and the first bottom portion 38b are alternately arranged along the central axis direction of the fixture 30. The plurality of first thread portions 38 may be arranged by being spaced at a predetermined angle, for example, an equal angle along the rotating direction of central axis on the outer circumferential surface. The first ridge portion 38a may be machined to have a radius that begins to increase gradually at a predetermined point in the outer circumference direction. Accordingly, stress on the upper part of a cortical bone may be reduced, and a fixing force at the cortical bone near a cancellous bone may be secured.

The second area section 34 may be located by being wholly combined with the bottom of the first area section 32 but is not limited thereto, and another structure may be located between the first and second area sections 32 and 34. The second area section 34 is a portion that is mostly inserted into the cancellous bone, but the upper part of the second area section 34 may be partially implanted in the cortical bone. The second area section 34 includes a second thread portion 40, which has a second ridge portion 40a machined in a spiral shape on the outer circumferential surface and a second bottom portion 40b formed with a smaller radius of the central axis, and the second ridge portion 40a and the second bottom portion 40b may be alternately arranged along the central axis direction of the fixture 30.

The second thread portion 40 may be successively connected to the first thread portion 38. Accordingly, without a drastic increase in implantation torque, the fixture 30 may be smoothly inserted into bone tissue. In addition, the second ridge portion 40a may be machined to have a smaller central axis radius than the first ridge portion 38a. Thus, the second ridge portion 40a may encourage smooth implantation in a cortical bone.

The third area section 36 is located under the second area section 34, thereby becoming the lowest part of the fixture 30. The third area section 36 may be an entry part that is inserted into a bone tissue first to form a female thread inside the bone tissue. The third area section 36 may have a third thread portion 42, which has a third ridge portion 42a machined in a spiral shape on the outer circumferential surface and a third bottom portion 42b formed with a smaller radius of the central axis. The third thread portion 42 may be machined to have a slope that converges towards the end, and the third ridge portion 42a and the third bottom portion 42b may be arranged alternately along the direction of central axis.

The cutting portion 44 may be provided at an equal interval along the outer circumferential surface, intersecting the second thread portion 40 and the third thread portion 42. The cutting portion 44 may have an up-sloping shape, winding in a spiral. As the cutting portion 44 traverses the second thread portion 40, insertion from the third area section 36 to the second area section 34 becomes easy.

The receiving portion 46 may be formed alone in the fixture 30 corresponding to the first and second area sections 32 and 34, and the hole of the second area section 34 may be machined to have a female thread for engaging with the screw 90. The receiving portion 46 may be machined to have a hole corresponding to the first area section 32, of which the diameter increases gradually towards the upper end. The hole of the first area section 32 may be formed to have an inner diameter that is larger than the diameter of first and second engagement structure alignment portions 68 and 72 of the fixture engagement structure 60.

The fixture 30 may include a first fixture alignment portion 48, a second fixture alignment portion 50, and a spacing portion 52 located between the fixture alignment portions 48 and 52, along the inner circumference direction of the receiving portion 46 of the first and second area sections 32 and 34, which is coupled to the fixture engagement structure 60. The fixture 30 may include the first fixture alignment portion 48 and the second fixture alignment portion 50, which have a structure for engagement with a first supporting portion 112 and a second supporting portion 120, in the first and second area sections 32 and 34 corresponding to the engagement portion 110 of the implantation driver 100.

Specifically, in order to match the first supporting portion 112, the first fixture alignment portion 48 may be arranged radially in the receiving portion 46. A plurality of the first fixture alignment portions 48 may be provided and may be arranged at an equal interval along the inner circumference direction. The first fixture alignment portion 48 may be machined to have a groove shape in a radial direction, that is, in the direction of radius tending outwards from a central axis of the fixture 30. In this case, the spacing portion 52 may be formed in a protruding shape. As another example, when the first supporting portion 112 of the implantation driver 100 of the fixture engagement structure 60 or the first engagement structure alignment portion 68 of the fixture engagement structure 60 is formed as a groove in a radial direction, the first fixture alignment portion 48 may be machined to have a protruding shape. In this embodiment, for the convenience of explanation, the first fixture alignment portion 48 is described to be formed in a groove shape.

In order to match the second supporting portion 120, the second fixture alignment portion 50 may be arranged radially in the receiving portion 46. The second fixture alignment portion 50 is disposed to be spacedly apart from the first fixture alignment portion 48 and may be arranged asymmetrically with respect to a center point of the fixture 30. The second fixture alignment portion 50 may have a larger size than the first fixture alignment portion 48 along at least one of the inner circumference direction and radial direction of the receiving portion 46. In addition, in order to correspond to the second supporting portion 120 and the second engagement structure alignment portion 72 illustrated in FIG. 5 and FIG. 12, at least one second fixture alignment portion 50 may be formed.

When the first fixture alignment portion 48 is formed in a groove shape or in a protruding shape, the second fixture alignment portion 50 may also be machined to have the same shape as the first fixture alignment portion 48. In this embodiment, for the convenience of explanation, the second fixture alignment portion 50 is described to be formed in a groove shape.

Figure 4:
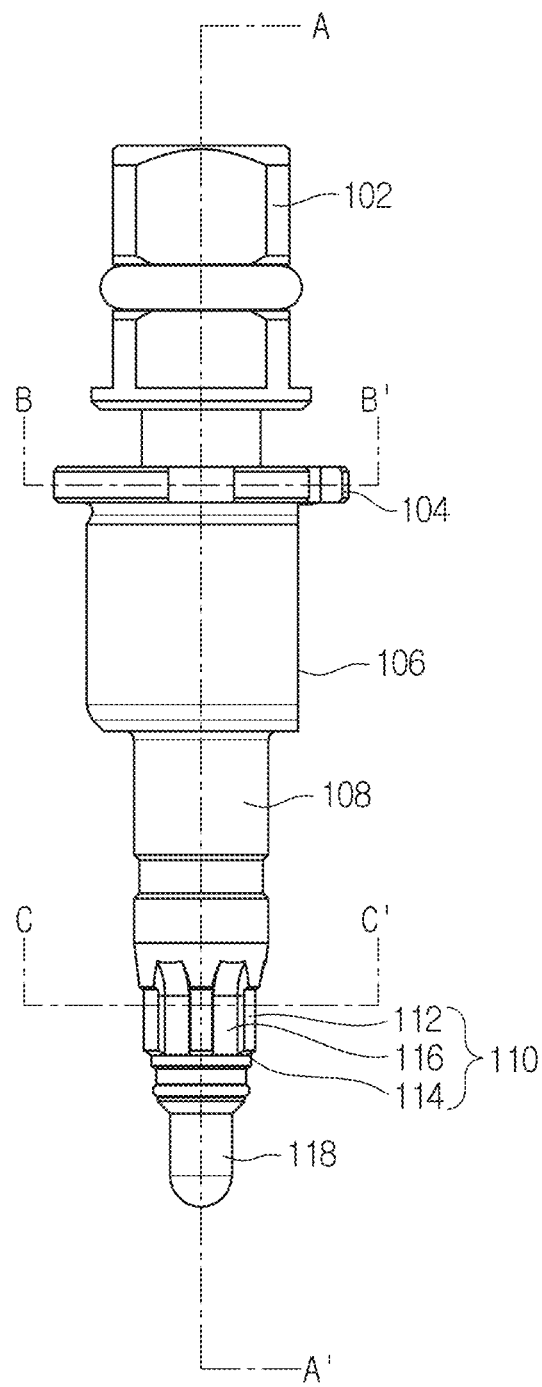
FIG. 4 is a perspective view of implantation driver according to the present disclosure.
Figure 5:
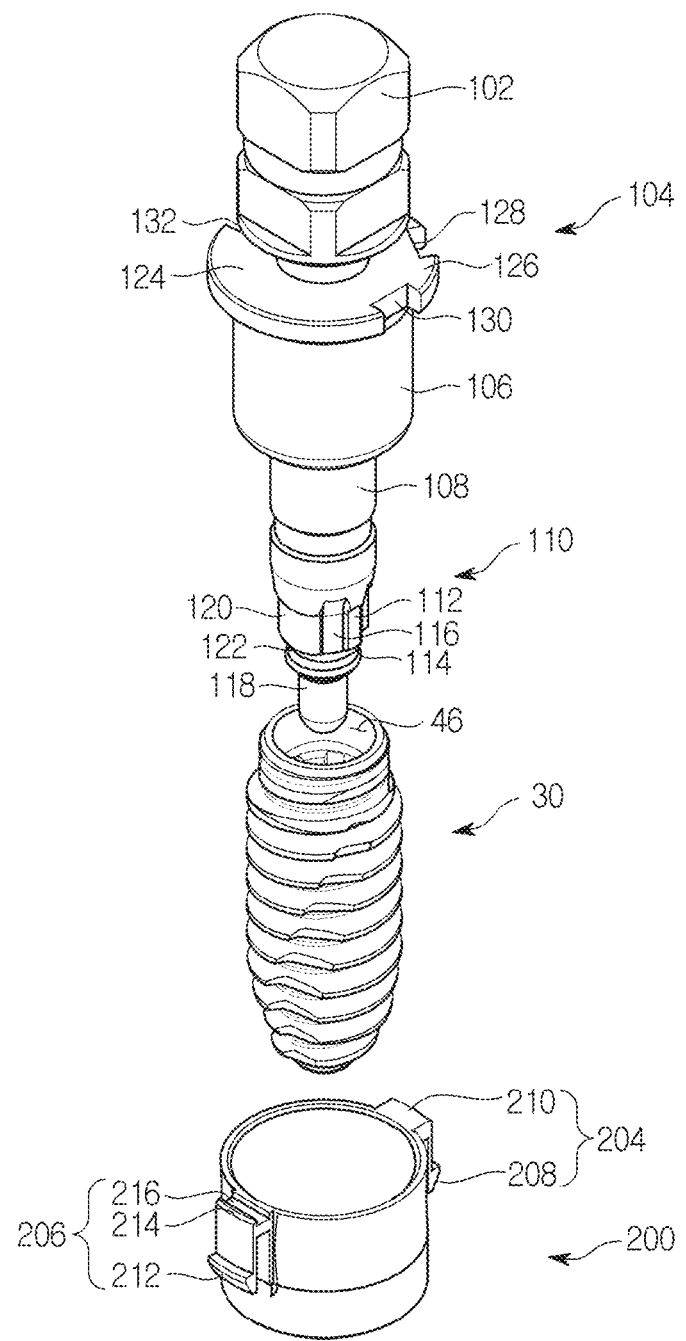
FIG. 5 is a perspective view in which an implantation driver and a sleeve, which constitute a surgical tool set for implant according to the present disclosure, are arranged together with a fixture.
Figure 7:
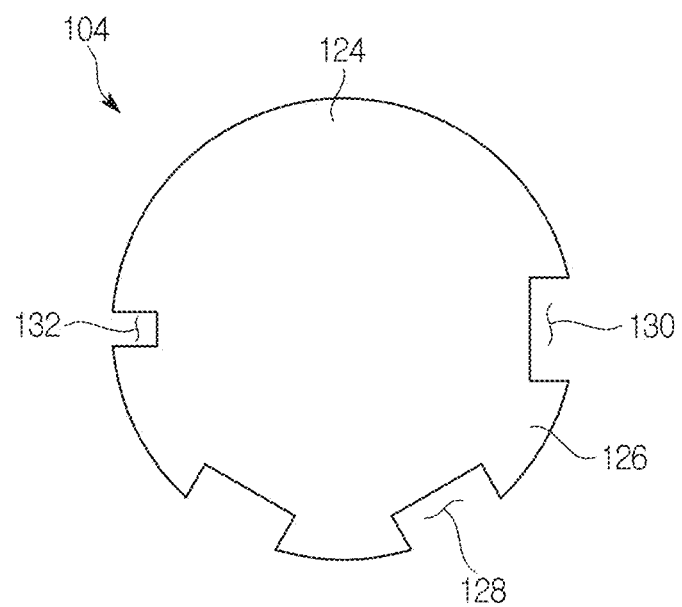
FIG. 7 is an embodiment regarding a recognition portion cut along the line B-B' of FIG. 4.
Figure 12:
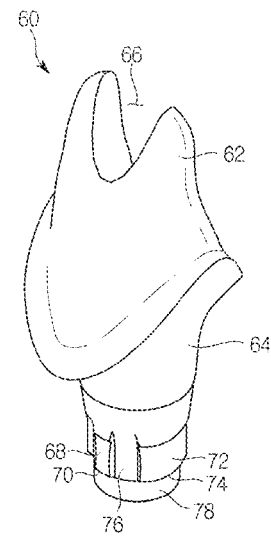
FIG. 12 is a perspective view of fixture engagement structure.

Referring to the first and second engagement structure alignment portions 68 and 72 and the first and second fixture alignment portions 48 and 50 matching the first and second supporting portions 112 and 120, which are illustrated in FIG. 5 and FIG. 12, the first fixture alignment portion 48 may be provided at an equal interval along an inner circumference direction. In case the second fixture alignment portion 50 does not exist, six first fixture alignment portions 48 may be provided at 60 degrees intervals. When four first fixture alignment portions 48 are arranged as in FIG. 3, the first fixture alignment portions 48 may be arranged symmetrically with respect to the center point of the fixture 30. As illustrated in FIG. 4 and FIG. 7, for quick and exact position alignment of one second engagement structure alignment portion 72 to the second fixture alignment portion 50 and for the convenience of machining, the second engagement structure alignment portion 72 may be formed to have a larger size than the first fixture alignment portion 48 along the inner circumference direction. As an example, for the convenience of machining, convenient checking of misalignment with the fixture engagement structure 60 and exact alignment, the second fixture alignment portion 50 along the inner circumference direction may be formed to be larger than a size of inner circumference virtually connecting the neighboring first fixture alignment portions 48. As another example, for convenient rotation and quick position alignment in case of misalignment with the fixture engagement structure 60, the second fixture alignment portion 50 along the inner circumference direction may be formed to be smaller than a size of inner circumference virtually connecting the neighboring first fixture alignment portions 48. In this embodiment, the second fixture alignment portion 50 is described to have a larger size than the first fixture alignment portion 48 along the inner circumference direction. However, as another example, the second fixture alignment portion 50 may be machined to have a larger size than the first fixture alignment portion 48 along the radial direction. Hereinafter, for the convenience of explanation, an embodiment will be described regarding the second fixture alignment portion 50 having a large size in the inner circumference direction. In an embodiment of the second fixture alignment portion having a large size in the radial direction, the second fixture alignment portion may also be formed to have a larger size than the first fixture alignment portion along the inner circumference direction.

The second fixture alignment portion 50 may be machined to be symmetric with respect to an inner diameter direction (or inner radial direction) of the receiving portion 46. However, like the second supporting portion 120 or the second engagement structure alignment portion 72, the shape and arrangement of the second fixture alignment portion 50 may be formed to be asymmetric with respect to the center point of the fixture 30. Specifically, the inner circumference of the second fixture alignment portion 50 along the inner circumference direction may be extended within a range of asymmetry with respect to the center point of the fixture 30. In case the inner circumference of the second fixture alignment portion 50 is extended to a range in which the inner circumference becomes symmetric with respect to the center point, the number of the first fixture alignment portions 48 may be reduced excessively. Thus, while the implantation driver 100 or the fixture engagement structure 60 rotates in the fixture 30, the first supporting portion 112 or the first engagement structure alignment portion 68 may be inserted deep into the second fixture alignment portion 50, thereby causing difficulty in additional rotation for expected position alignment.

In addition, as shown in FIG. 3, the second fixture alignment portion 50 may be arranged asymmetrically with every first fixture alignment portion 48 with respect to the center point of the fixture 30. Accordingly, an abutment, which is fabricated to have a predetermined specific position or rotational orientation, may be exactly arranged and engage with the fixture 30 in accordance with the manufacturer's intent.

In an embodiment of the second engagement structure alignment portion having a large size in the radial direction of the fixture engagement structure 60, the second fixture alignment portion may be formed to be asymmetric with respect to the center point of the fixture 30 in order to correspond to the second engagement structure alignment portion, and may be arranged asymmetrically with every first fixture alignment portion with respect to the center point.

Figure 9:
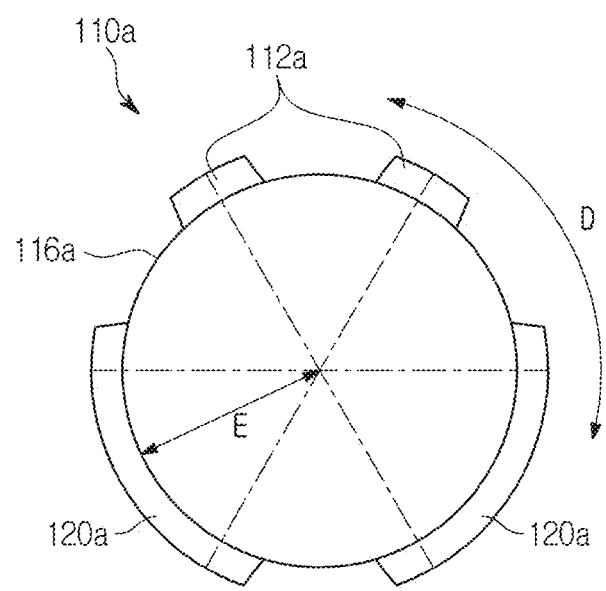
FIG. 9 is another embodiment regarding an engagement portion cut along the line C-C' of FIG. 4.

In case a plurality of the second supporting portions 120 or the second engagement structure alignment portions is arranged as illustrated in FIG. 9, the second fixture alignment portion is actually the same as described in FIG. 2, apart from what is described below.

For a specific position alignment between the fixture engagement structure 60 and the fixture 30, the second fixture alignment portions may be arranged asymmetrically with each other with respect to the center point so that they may correspond to the second supporting portion 120 or the second engagement alignment portions of FIG. 9.

In addition, in response to the second supporting portion 120 of FIG. 9, the second fixture alignment portions may be disposed following the first fixture alignment portions that are successively arranged. As another example, the second fixture alignment portions may be alternately arranged one by one between the first fixture alignment portions. In order to align and engage an abutment, which is fabricated to have a unique position or rotational orientation, exactly with the fixture 30, the second fixture alignment portions in the above cases may be arranged asymmetrically with every first engagement structure alignment portion 68.

In an embodiment of a second fixture alignment portion having a large size in a radial direction E, second fixture alignment portions may also be arranged in a multiple number, and the above description regarding an embodiment according to the inner circumference direction may be similarly applied.

Figure 11:
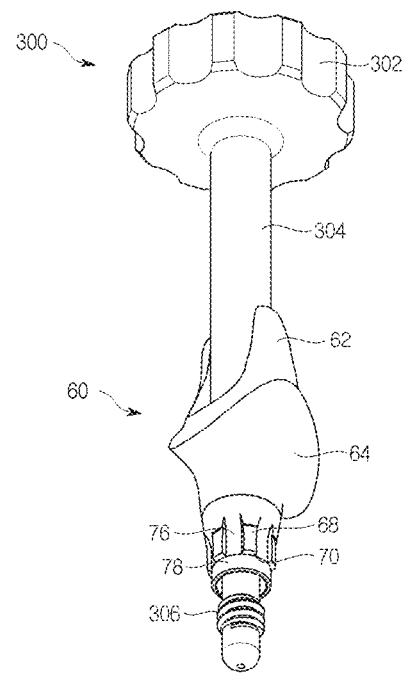
FIG. 11 is a perspective view showing an engagement structure mounting tool and a fixture engagement structure according to the present disclosure.

The above-described embodiment regarding the fixture 30 shows the arrangement of the first fixture alignment portions 48 at 60 degrees intervals in order to correspond to the implantation driver 100 illustrated in FIG. 4 or the fixture engagement structure 60 illustrated in FIG. 11, but the present disclosure is not limited thereto. For example, when the first supporting portion 112 or the first engagement structure alignment portions 68 are uniformly spaced at a different angle, the first fixture alignment portions 48 may also be arranged at equal intervals of 90 degrees and may also be arranged at equal intervals of 45 degrees.

When the implantation driver 100 enters the fixture 30, the spacing portion 52 may be machined to have an inner diameter very close to a gap portion 116 of the implantation driver 100. In addition, the spacing portion 52 may be formed to have an inner diameter very close to a side wall of a guide portion 78, when the fixture engagement structure 60 enters the fixture 30. Thus, it is possible to easily implement additional rotation of the fixture engagement structure 60 for exact position alignment on the fixture 30.

The spacing portion 52 may have a fixture end portion 54 that is located at a side end facing the fixture engagement structure 60. The fixture end portion 54 may be formed to be tapered. A taper shape of the fixture end portion 54 may be formed in a shape corresponding to the first and second supporting ends 114 and 122 of the implantation driver 100. Also, a taper shape of the fixture end portion 54 may be formed in a shape corresponding to the first and second engagement structure end portions 110 and 116 of the fixture engagement structure 60. As the first and second supporting ends 114 and 122 and the fixture end portion 54 are in contact and friction, a practitioner may be able to combine the implantation driver 100 easily and stably. In addition, as the first and second engagement structure end portions 110 and 116 and the fixture end portion 54 are in contact and friction, the practitioner may be able to rotate the implantation driver 100 easily and stably.

In addition, the fixture end portion 54 may be machined to have a same level in a longitudinal direction along the central axis in order to smoothly rotate through touch with the first and second supporting ends 114 and 122. Furthermore, as the fixture end portion 54 has a same level, the fixture engagement structure 60 may smoothly rotate through touch with the first and second engagement structure end portions 70 and 74. In case the fixture end portion 54 is arranged at different levels, grooves with different heights may be formed according to the first and second fixture alignment portions 48 and 50. Thus, when the implantation driver 100 enters the fixture 30, the supporting portions 112 and 120 and the fixture alignment portions 48 and 50, which do not correspond to each other, may be combined and aligned erroneously so that additional rotation for correct alignment may not be easy.

Referring to FIG. 4 and FIG. 5, the implantation driver 100 and the sleeve 200 according to the present disclosure will be described in detail. FIG. 4 is a perspective view of implantation driver according to the present disclosure. FIG.

5 is a perspective view in which an implantation driver and a sleeve, which constitute a surgical tool set for implant according to the present disclosure, are arranged together with a fixture.

The implantation driver 100 may include, along the line A-A' of central axis, an installation portion 102, in which a handpiece (not illustrated herein) providing torque is fit, a recognition portion 104, a body portion 106, an engagement portion 110, which engages with the fixture alignment portions 48 and 50 of the fixture 30 and transmits implantation torque to the fixture 30, and a guide tip portion 118.

The installation portion 102 may be equipped with a solid securing structure for preventing a dental handpiece from deviating. As a hand drill device for providing torque to the implantation driver 100, the dental handpiece may have a connecting portion on one side, which is coupled to the installation portion 102. The installation portion 102 connects a dental handpiece and the body portion 106 and may transmit torque, which has been transmitted to the installation portion 102, to the body portion 106. In addition, the installation portion 102 may be formed irrespective of a size of the engagement portion 110. However, it is advisable to machine the installation portion 102 with a larger size than the engagement portion 110 in order to transmit implantation torque stably.

Figure 6:
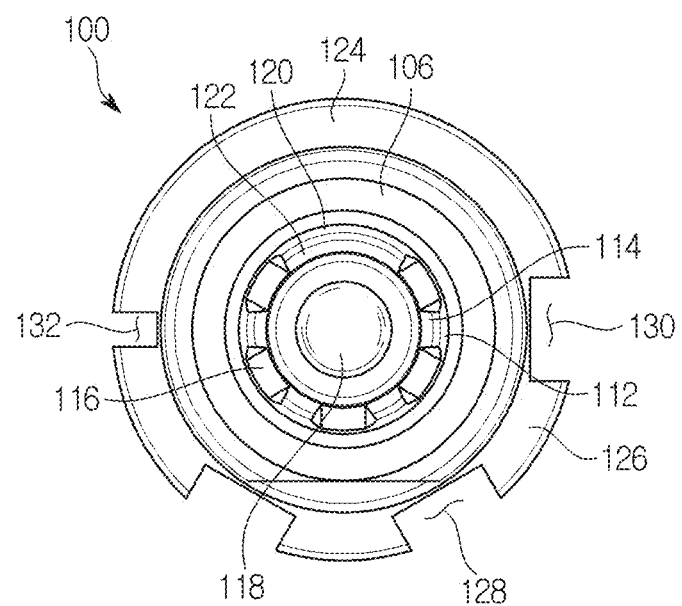
FIG. 6 is a bottom view of implantation driver according to the present disclosure.

The recognition portion 104 is disposed under the installation portion 102 and may identify at least one of the alignment position and alignment direction of the fixture 30, when implantation is performed by the implantation driver 100. As an example, the recognition portion 104 may include a position identification portion 124, which identifies the position and rotational direction of the second fixture alignment portion 50 during implantation, a plurality of dummy portions 126, which are disposed spacedly from the position identification portion 124, and a dummy gap portion 128 prepared between the dummy portions 126. As illustrated in FIG. 6, the position identification portion 124 may be disposed to correspond to the second supporting portion 120 of the engagement portion 110 that is coupled to the second fixture alignment portion 50. FIG. 6 is a bottom view of implantation driver according to the present disclosure. The position identification portion 124 may have a larger size than the dummy portion 126 in at least one of the outer circumference direction and radial direction of the recognition portion 104. In addition, the dummy gap portion 128 may be machined in a groove shape between the dummy portions 126. For example, the position identification portion 124 may be formed to have a larger size than the dummy portion 126 along the outer circumference direction, as shown in FIG. 7. FIG. 7 is an embodiment regarding a recognition portion cut along the line B-B' of FIG. 4. In addition, in order to identify easily the alignment position and direction of the fixture 30 during implantation, the position identification portion 124 and the dummy portion 126 may be formed to protrude more than other elements of the implantation driver 100 in a radial direction for the central axis (line A-A'), as illustrated in FIG. 4 and FIG. 6. Specifically, in order to settle the recognition portion 104 on an outer circumference end portion of the body portion 202 when the sleeve 200 is inserted, the position identification portion 124 and the dummy portion 126 may protrude more than the body portion 202 of the sleeve 200. FIG. 6 and FIG. 7 illustrate an embodiment in which the position identification portion 124 has a larger size than the dummy portion 126, but the present disclosure is not limited thereto. In another example, the position identification portion and the dummy portion are formed in a same size. In order to identify at least one of the alignment position and alignment direction of the fixture 30, the position identification portion may have a mark portion (not illustrated herein) in a portion visible to the naked eye of a practitioner. The mark portion may be a visually identifiable mark like a sign in a different color from the recognition portion 104, a tiny groove or projection. The mark portion may be disposed to correspond to the second supporting portion 120 of the engagement portion 110. In addition, FIG. 5 and FIG. 6 show an example of the recognition portion 104 in a case where there is one second supporting portion 120. However, as in FIG. 9, when there are multiple second supporting portions 120a, the recognition portion may have a position identification portion, which identifies at least one of the position and rotational direction of the second fixture alignment portion 50 coupled to the second supporting portions 120a, and a dummy portion that is disposed distant from the position identification portion. In this case, in order to correspond to the second supporting portions 120a, the position identification portion may have two identification portions that are formed with a larger size than the dummy portion. As another example, even when the position identification portion 124 is formed in the same size as the dummy portion, the position identification portion 124 may have at least one mark portion capable of identifying the alignment position and direction of the second supporting portion 120a. The mark portion may be formed to identify roughly two second supporting portions 120a or may be formed as different marks for distinguishing each of the second supporting portions 120a. As yet another example, the position identification portion may be formed to have a size covering all the two second supporting portions 120a. The position identification portion covering all the second supporting portions 120a may be equipped with a mark portion that is formed to identify roughly the second supporting portions 120a. As yet another example, the mark portion may be formed as different marks for distinguishing each of the second supporting portions 120a.

The recognition portion 104 is disposed between one side of the position identification portion 124 and the dummy portion 126 and may further include an alignment identification portion 130 that has a check area making a specific mark of the sleeve 200 recognized when the fixture 30 is implanted using the implantation driver 100. In addition, the recognition portion 104 is disposed between the other side of the position identification portion 124 and the dummy portion 126 and may further include an auxiliary identification portion 132 that has an auxiliary area section formed in a smaller size than the check area of the alignment identification portion 130.

Before the alignment and auxiliary identification portions 130 and 132 are described, the sleeve 200 according to the present disclosure will be described in detail with reference to FIG. 1 and FIG. 5.

When the fixture 30 is being implanted, the sleeve 200 may support and guide the fixture 30 to a jawbone. The sleeve 200 may be equipped with a body portion 202, which has a hollow structure that the fixture 30 passes through, and a plurality of connecting portions 204 and 206 that are disposed around the body portion 202 to be fit into a guide hole of the guide device 20 exposing an implantation position of the fixture 30.

The first connecting portion 204 may have a first link end portion 208 with an engagement structure capable of engaging and disengaging with the guide hole and a first side end portion 210 that protrudes beyond the body portion 202 and is disposed between the body portion 202 and the first link end portion 208.

The second connecting portion 206 is disposed around the body portion 202 but apart from the first connecting portion 204 and may provide a reference point for at least one of the alignment position and alignment direction of the fixture 30. Specifically, the second connecting portion 206 may include a second link end portion 212 with an engagement structure capable of engaging and disengaging with the guide hole, a second side end portion 214 that protrudes beyond the body portion 202 and is disposed between the body portion 202 and the second link end portion 212, and an alignment mark portion 216 that is identifiable by a naked eye on the second side end portion 214. The alignment mark portion 216 may function as a reference point for the alignment position and direction of the fixture 30 during implantation. As an example, the alignment mark portion 216 may be formed in a groove shape, as shown in FIG. 5. The present disclosure is not limited thereto. As another example, the alignment mark portion 216 may be formed as a projection and a mark in a different color from the sleeve 200. In order to easily identify the alignment mark portion 216 during implantation, the second connecting portion 206 providing the alignment mark portion 216 may be mounted on the end of a guide hole of the guide device 20 corresponding to the outer gum, as shown in FIG. 1. The sleeve 200 illustrated in FIG. 1 and FIG. 5 has two connecting portions 204 and 206 but is not limited thereto. As an example, the sleeve may have three or more connecting portions, and an alignment mark portion may be provided to a connecting portion, among the connecting portions, which engages and disengages with the end of a guide hole corresponding to an outer gum.

Referring to FIGS. 5 to 7 again, the alignment identification portion 130 may have a check area enabling the alignment mark portion 216 of the sleeve 200 to be recognized, in order to visually identify the alignment direction and position of the fixture 30 and the implantation driver 100 in an implantation process (or in a rotating process of the implantation driver 100). The check area may be formed to be so recessed as to have a smaller radius than the position identification portion 124 and the dummy portion 126 along a radial direction for the central axis (line A-A'). The check area may be recessed to have a size enabling a practitioner to clearly recognize the alignment mark portion 216 during implantation. For example, the check area may be formed to be larger than the alignment mark portion 216 or may be recessed to a size enabling most of the alignment mark portion 216 to be recognized. In this case, the alignment identification portion 130 may be machined to have a larger size than the dummy gap portion 128 along the outer circumference direction of the recognition portion 104.

An auxiliary area section of the auxiliary identification portion 132 may be formed by being recessed to a smaller size than the check area of the alignment identification portion 130. The auxiliary identification portion 132 may be machined to a size that disables the alignment mark portion 216 of the sleeve 200, which is fixed in the process of implantation, from being clearly recognized. In this case, the auxiliary identification portion 132 may be machined to have a smaller size than the dummy gap portion 128 along the outer circumference direction of the recognition portion 104. Thus, as the alignment mark portion 216 and the auxiliary identification portion 132 are clearly distinguished, it is possible to recognize the alignment position and direction of the implantation driver 100 and the fixture 30.

Specifically, when the implantation driver 100 rotates on the sleeve 200 secured to the guide device 20, if a practitioner sees that the alignment identification portion 130 is located near the alignment mark portion 216 or identifies the alignment identification portion 216 through the alignment identification portion 130, the practitioner may recognize that the second supporting portion 120 or the second fixture alignment portion 50 is aligned in a predetermined position and/or direction for the alignment mark portion 216. Although an alignment position and direction are identified mainly through the alignment identification portion 130, the auxiliary identification portion 132 may additionally check the alignment position and direction of the fixture 30. When the practitioner is unable to visually identify the alignment mark portion 216 through the auxiliary identification portion 132 located near the alignment mark portion 216 or the practitioner identifies the auxiliary identification portion 132 located near the end of a guide hole corresponding to an outer gum, the practitioner may identify an alignment position and direction of the second supporting portion 120 or the second fixture alignment portion 50.

A surgery simulation program may simulate a patient's oral structure and may provide a practitioner with a virtual model and/or data representing alignment positions and directions among the fixture 30, the implantation driver 100 and the sleeve 200 in a target position of implant operation. In an actual implantation procedure of the fixture 30 using the implantation driver 100 and the sleeve 200, an initial position of the fixture 30 and/or the implantation driver 100 and a final position after implantation, which are provided by the surgery simulation program, may be verified in a real oral structure by using the position identification portion 124 of the recognition portion 104, the alignment and auxiliary identification portion 132 and the alignment mark portion 216 of the sleeve 200 according to the present disclosure. Accordingly, the practitioner may perform an actual procedure by recognizing exactly not only the arrangement relation of the fixture 30 and a surgical tool to be used for implantation but also the alignment position and direction of the fixture 30 and the implantation driver 100 according to implantation rotation.

Meanwhile, the body portion 106 of the implantation driver 100 may transmit implantation torque, which is transmitted from the installation portion 102, to an extending portion 108 and the engagement portion 110, which are positioned below. The body portion 106 may be a part corresponding to the body portion 202 of the sleeve 200, when the implantation driver 100 is inserted into the sleeve 200. When the body portion 106 is inserted into the body portion 202, the body portion 106 may be machined to an actually same structure as the hollow structure of the body portion 202 in order to transmit torque stably. In addition, the body portion 106 may be formed to have an actually same outer diameter as the inner diameter of the hollow structure.

The extending portion 108 may arrange the body portion 106 and the engagement portion 110 by making them spacedly apart from each other and may be formed to have a smaller diameter than the body portion 106. When the implantation driver 100 engages with the fixture 30, the extending portion 108 may help the lower end of the body portion 106 not touch the fixture 30. Accordingly, the rotation of the implantation driver 100 and the implantation of the fixture 30 may be smoothly implemented.

Referring to FIGS. 4 to 6, the engagement portion 110 may include the first supporting portion 112 and the second supporting portion 120, which are positioned under the extending portion 108, and the gap portion 116 located between the supporting portions 112 and 120.

The first supporting portion 112 may be radially disposed in the engagement portion 110 that engages with the fixture 30 and transmits implantation torque. A multiple number of the first supporting portions 112 may be provided and be arranged at an equal interval along the outer circumference direction (D of FIG. 8) of the engagement portion 110. The first supporting portion 112 may be machined to have a protruding shape in a radial direction (E of FIG. 8), that is, in the direction of radius tending outwards from a central axis (line A-A') of the implantation driver 100. In this case, the gap portion 116 may be formed in a groove shape. As another example, the first supporting portion 112 may be machined to have a groove shape in a radial direction. In this case, the gap portion 116 may be formed in a protruding shape. In this embodiment, for the convenience of explanation, the first supporting portion 112 will be described to be formed in a protruding shape.

The first supporting portion 112 may have the first supporting end 114 located at a side end facing the fixture 30. The first supporting end 114 may be formed to be tapered. A taper shape of the first supporting end 114 may be formed in a shape corresponding to the fixture end portion 54 disposed on top of the spacing portion 52 of the fixture 30. When the implantation driver 100 rotates to align its position to the fixture 30, the first supporting end 114 and the fixture end portion 54 are in contact and friction. Thus, a practitioner may be able to rotate the implantation driver 100 stably and easily.

Figure 8:
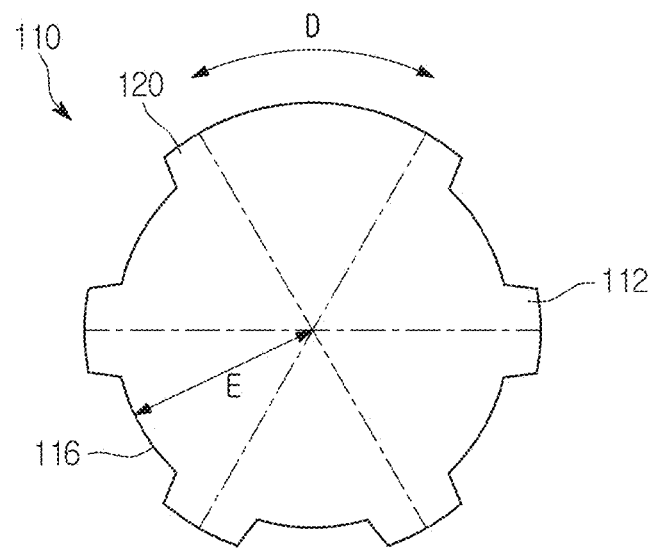
FIG. 8 is an embodiment regarding an engagement portion cut along the line C-C' of FIG. 4.

The second supporting portion 120 is arranged radially in the engagement portion 110 to be spacedly apart from the first supporting portion 112. The second supporting portion 120 may be arranged asymmetrically with respect to a center point located on the central axis (line A-A') of the implantation driver 100. The second supporting portion 120 may have a larger size than the first supporting portion 112 in at least one of the outer circumference direction D and the radial direction E of the engagement portion 110. In addition, as illustrated in FIG. 8 and FIG. 9, at least one second supporting portion 120 may be formed. FIG. 8 is an embodiment regarding an engagement portion cut along the line C-C' of FIG. 4, and FIG. 9 is another embodiment regarding an engagement portion cut along the line C-C' of FIG. 4.

When the first supporting portion 112 is formed to protrude, the second supporting portion 120 may be machined to have a protruding shape in a radial direction. As another example, when the first supporting portion 112 is formed as a groove, the second supporting portion 120 may be machined to have a groove shape in a radial direction E. In this embodiment, for the convenience of explanation, the second supporting portion 120 is described to be formed in a protruding shape.

In case the first and second supporting portions 112 and 120 are described with reference to FIG. 8, the first supporting portion 112 may be provided at an equal interval along the outer circumference direction D. In case the second supporting portion 120 does not exist, the first supporting portion 112 may be provided at 60 degrees interval so that the number of the first supporting portions thus arranged becomes six. When four first supporting portions 112 are arranged as in FIG. 8, the first supporting portions 112 may be arranged symmetrically with respect to a center point or a diameter according to the line C-C'. As illustrated in FIG. 8, for quick and exact position alignment of one second supporting portion 120 to the second fixture alignment portion 50 of the fixture 130, the second supporting portion 120 may be formed to have a larger size than the first supporting portion 112 along the outer circumference direction D. As an example, for the convenience of machining, convenient checking of misalignment with the fixture 30 and exact alignment, the second supporting portion 120 along the outer circumference direction D may be formed to be larger than a size of outer circumference virtually connecting the first supporting portions 112 that are adjacent to each other. In this embodiment, the second supporting portion 120 is described to have a larger size than the first supporting portion 112 along the outer circumference direction D. However, as another example, the second supporting portion 120 may be machined to have a larger size than the first supporting portion 112 along the radial direction E. In this case, the fixture alignment portion 50 may be formed to have a larger size than the first alignment portion 48 along the radial direction. Hereinafter, for the convenience of explanation, an embodiment will be described regarding the second supporting portion 120 having a large size in the outer circumference direction D. In an embodiment of the second supporting portion having a large size in the radial direction D, the second supporting portion may also be formed to have a larger size than the first supporting portion along the outer circumference direction E.

The second supporting portion 120 may be machined to be symmetric with respect to a diameter according to the line C-C'. However, the shape and arrangement of the second supporting portion 120 may be formed to be asymmetric with respect to a center point. Specifically, an outer circumference of the second supporting portion 120 along the outer circumference direction D may be extended within a range that is asymmetric with respect to the center point. In case the outer circumference of the second supporting portion 120 is extended to a range in which the outer circumference becomes symmetric with respect to the center point, the number of the first supporting portions 112 may be reduced excessively. Thus, while the implantation driver 100 engages with the fixture 30, the first supporting portion 112 may be inserted deep into the second fixture alignment portion 50 of the fixture 30, thereby causing difficulty in additional rotation for expected position alignment.

In addition, as shown in FIG. 8, the second supporting portion 120 may be arranged asymmetrically with every first supporting portion 112 with respect to the center point. Accordingly, the second supporting portion 120 may be accurately coupled to the second fixture alignment portion 50 of the fixture 30, which is fabricated by a manufacturer to have a predetermined specific position or rotational orientation. In an embodiment of the second supporting portion having a large size in the radial direction E, the second supporting portion itself may be formed to be asymmetric with respect to the center point, similar to what is described above, and may be arranged asymmetrically with every first supporting portion with respect to the center point.

The second supporting portion 120 may have the second supporting end located at a side end facing the fixture 30. The second supporting end 122 may be formed to be tapered. A taper shape of the second supporting end 122 may be formed in a shape corresponding to the fixture end portion 54 and the first supporting end 114. When the implantation driver 100 rotates to align its position to the fixture 30, the first and second supporting ends 114 and 122 and the fixture end portion 54 are in contact and friction. Thus, a practitioner may be able to rotate the implantation driver 100 stably and easily.

In addition, the first and second supporting ends 114 and 122 may be machined to have a same level in a longitudinal direction along the central axis in order to prevent the disadvantage that will be described below. In case the first supporting end 114 is extended further than the second supporting end 122 in a direction toward the bottom of the engagement portion 110, when the implantation driver 100 enters into the fixture 30, the first supporting portion 112 may be inserted into the second fixture alignment portion 50 having a larger size than the first fixture alignment portion 48. Thus, the implantation driver 100 may be misaligned in an inaccurate position of the fixture 30, and additional rotation may not be easy.

The embodiment illustrated in FIG. 9 assumes that a multiple number of second supporting portions 120*a* and 120*b* are arranged. The second supporting portions 120*a* and 120*b* illustrated in FIG. 9 are actually the same as in FIG. 8, except what is described below.

For specific position alignment, for example, in order to match two second fixture alignment portion 50 in the fixture 30, which are set for one unique position or rotational orientation designated by a manufacturer for the fixture engagement structure 60, the two second supporting portions 120*a* and 120*b* illustrated in FIG. 9 may be arranged to be asymmetric with each other with respect to the center point. In case the second supporting portions 120*a* and 120*b* and the corresponding second fixture alignment portions are symmetric with respect to the center point, even when one unique position is determined by the manufacturer's asymmetric machining of the apical area section 62, an error may occur in which the second supporting portions 120*a* and 120*b* and the second fixture alignment portions are coupled in a position or orientation that is not intended by the manufacturer. Accordingly, in order to prevent the error, the multiple second supporting portions 120*a* and 120*b* and the second fixture alignment portions may be arranged to be asymmetric with respect to the center point.

In addition, as illustrated in FIG. 9, the second supporting portions 120*a* and 120*b* may be arranged following the first supporting portions 112 that are successively arranged. As another example, the second supporting portions 120*a* and 120*b* may be arranged at least one by one alternately between the first supporting portions 112. Alternatively, a random number of the second supporting portions 120*a* and 120*b* may be arranged between the first engagement structure alignment portions 108*a*. In order to align and engage the implantation driver 100, which is fabricated to have a unique position or rotational orientation, exactly with the fixture 30, the second supporting portions 120*a* and 120*b* in the above cases may be arranged asymmetrically with every first engagement structure alignment portion 68.

In an embodiment of a second supporting portion having a large size in the radial direction E, second supporting portions may also be arranged in a multiple number, and the above description regarding an embodiment according to the outer circumference direction may be similarly applied.

The above-described embodiment for the implantation driver 100 shows an example of arranging the first supporting portion 112 at 60 degree interval, but is not limited thereto. For example, the first supporting portion 112 may be arranged at an equal interval of 90 degrees and may be arranged at an equal interval of 45 degrees.

The guide tip portion 118 is provided at the lower end of the engagement portion 110 and may be disposed closer to the fixture 30 than the first and second supporting portions 112 and 120 when engaging with the fixture 30. The guide tip portion 118 may be fabricated to have a smaller diameter than an inner fastening portion 80 of the fixture 30. Accordingly, the implantation driver 100 may easily enter into a receiving portion 46 of the fixture 30. In addition, the inner fastening portion (refer to 80 of FIG. 13A) is not damaged during implantation rotation, and the rotation of the implantation driver 100 and the implantation of the fixture 30 may be smoothly implemented.

Hereinafter, referring to FIG. 1 and FIGS. 10A to 10F, an operation of implanting the fixture 30 by means of the implantation driver 100 and the sleeve 200, which constitute a surgical tool set for implant according to the present disclosure, will be described.

FIGS. 10A to 10F are views illustrating a process of implanting a fixture by using an implantation driver and a sleeve that constitute a surgical tool for implant according to the present disclosure. The operation below will be described based on the implantation driver 100, of which the detailed configurations of the recognition portion 104 and the engagement portion 110 have the structures illustrated in FIGS. 6 to 8, the sleeve 200 having the structure illustrated in FIG. 5, and the fixture 30 illustrated in FIG. 2 and FIG. 3.

Figure 10A:
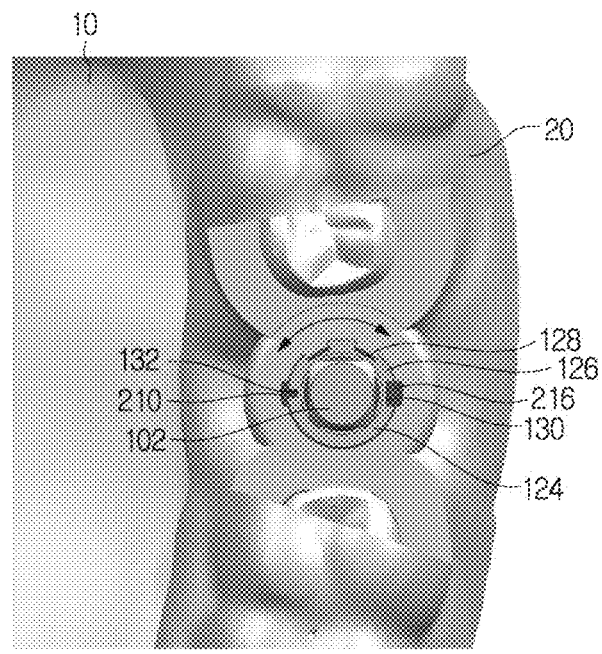
FIGS. 10A to 10F are views illustrating a process of implanting a fixture by using an implantation driver and a sleeve that constitute a surgical tool for implant according to the present disclosure.

First, referring to FIG. 1 and FIG. 10A, a practitioner may arrange the guide device 20 like a surgical guide on a patient's tooth 12. Herein, the practitioner may arrange a guide hole of the guide device 20 to the implantation hole 56 in order to expose an implantation hole (refer to 56 of FIG. 10F) that is already formed as a surgery spot. Herein, the sleeve 200 may be mounted on the guide hole. Herein, the sleeve 200 may be mounted so that the second connecting portion 206 having the alignment mark portion 216 may be located at the end of the guide hole corresponding to an outer gum. A surgery simulation program has library for mounting the second connecting portion 206 in a specific position of the guide hole, and the alignment mark portion 216 may provide a reference point for at least one of the alignment position and alignment direction of the implantation driver 100 and the fixture 30 during an actual process of implantation.

Next, by referring to alignment positions and directions among the fixture 30, the implantation driver 100 and the sleeve 200 at a target spot of implant procedure, based on a virtual model and/or data provided by the surgery simulation program, the practitioner may engage the implantation driver 100, which is installed in the handpiece (not illustrated), with the fixture 30 and then may align the implantation driver 100 engaging with the fixture 30 in the surgery spot. Specifically, as illustrated in FIG. 5, for specific alignment of the position and direction of the fixture 30 required by the surgery simulation program, the practitioner may couple the first and second supporting portions 112 and 120 of the implantation driver 100 to the first and second fixture alignment portions 48 and 50 of the fixture 30. Unlike the first supporting portion 112, the second supporting portion 120 has a large size along the outer circumference direction D and thus may be uniquely coupled to the second fixture alignment portion 50. Next, as shown in FIG. 10A, in order to arrange the alignment identification portion 130 of the recognition portion 104 on the alignment mark portion 216, the practitioner may perform position of the engaged implantation driver 100 on the sleeve 200 and may insert the engaged implantation driver 100 into the sleeve 200 in the aligned position. Accordingly, the practitioner may proceed an actual surgery according to an initial position required by the surgery simulation program, that is, according to an alignment position and/or direction in which the engaged implantation driver 100 initially settles in the sleeve 200.

Figure 10B:
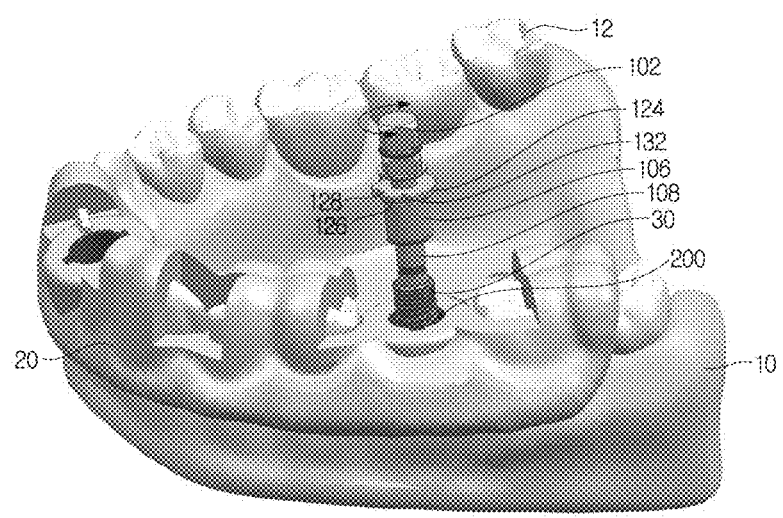

Next, referring to FIG. 10B, the practitioner may place the fixture 30 in the implantation hole 56 by using implantation torque that occurs in the handpiece. The fixture 30 may be inserted into the implantation hole 56, while expanding the implantation hole 56. In the process of rotating the fixture 30, the practitioner may identify an alignment position and direction of the second fixture alignment portion 50 in the implantation hole 56 through the position identification portion 124. Also, in the rotation process, the practitioner may identify the alignment position and direction of the fixture 30 by means of the alignment identification portion 130, the auxiliary identification portion 132 and the alignment mark portion 216.

Figure 10C:
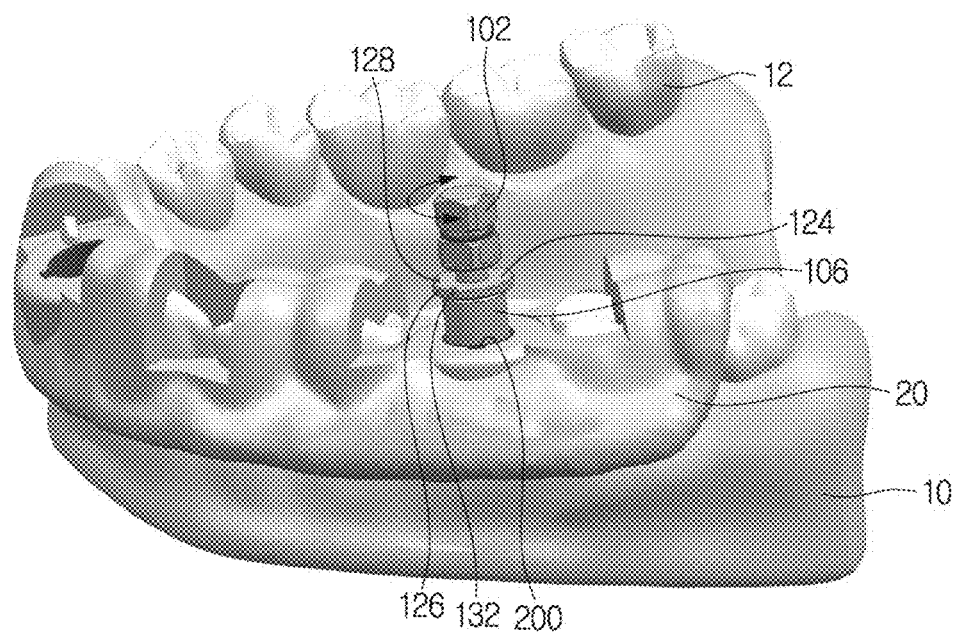

Next, referring to FIG. 10C, as the fixture 30 rotates and enters further into the implantation hole 56, the body portion 106 may be inserted by adhering to the body portion 202 of the sleeve 200. As the body portion 202 closely supports the body portion 106, the practitioner may stably insert the fixture 30 in an exact position of the implantation hole 56. In addition, the practitioner may easily identify the alignment position and direction of the fixture 30 by adjusting the rotation speed of the fixture 30.

Figure 10D:
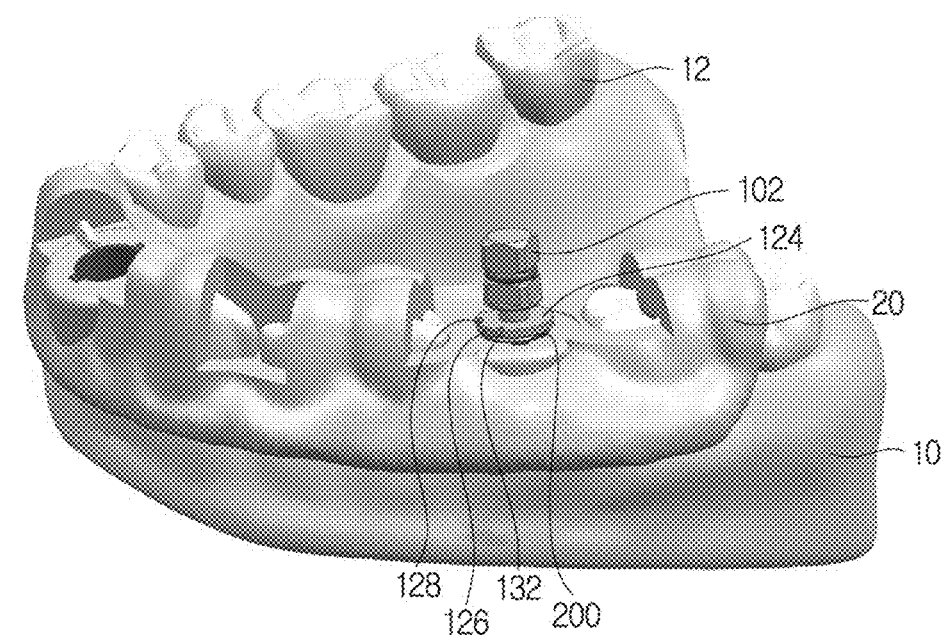

Next, referring to FIG. 10D, the rotation of the fixture 30 may enable the fixture 30 to further enter the implantation hole 56 until the recognition portion 104 touches the upper part of the body portion 202. The practitioner may stably insert the fixture 30 in an exact position of the implantation hole 56. While precisely rotating the fixture 30, the practitioner may identify the position identification portion 124, the alignment identification portion 130, the auxiliary identification portion 132 and the alignment mark portion 216. Thus, the fixture 30 may be rotated to move an alignment position, which is a final position demanded by the surgery simulation program, and in an alignment direction.

Figure 10E:
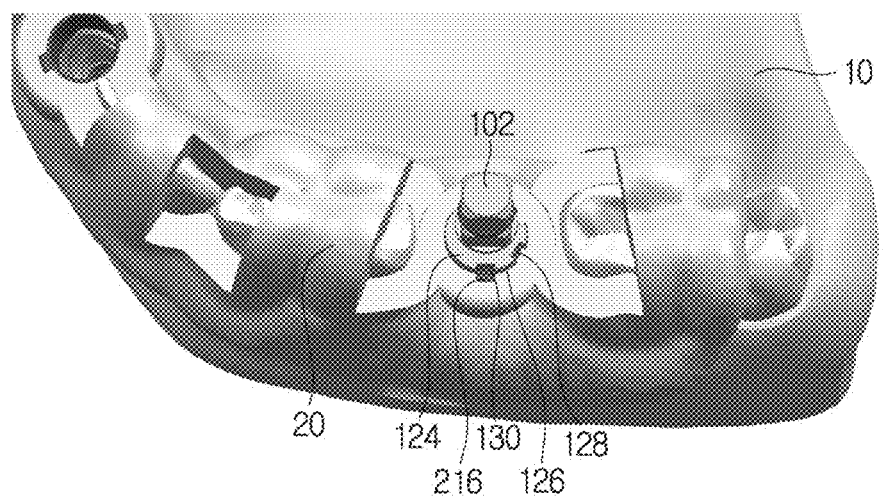
Figure 10F:
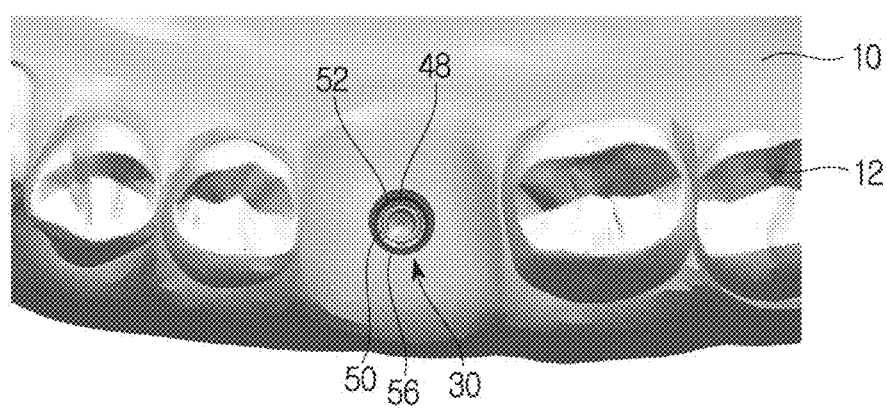

Referring to FIG. 10E, while the recognition portion 104 touches the body portion 202, the practitioner may rotate the fixture 30 to a final position demanded by the surgery simulation program, that is, a position in which the alignment mark portion 216 may be clearly identified by naked eyes through the alignment identification portion 130. When the fixture 30 rotates to the final position, the practitioner may separate the implantation driver 100 from the fixture 30 and may remove the guide device 20 from the tooth 12. Referring to FIG. 10F, it may be identified that the fixture 30 is placed in a final position in the implantation hole 56, which is demanded by the surgery simulation program. Herein, for example, the final position may be a position and a direction in which the second fixture alignment portion 50 is aligned closer to a left tooth, while facing neighboring teeth.

Hereinafter, referring to FIG. 11 and FIG. 12, an engagement structure mounting tool constituting a surgical tool set for implant according to the present disclosure will be described.

FIG. 11 is a perspective view showing an engagement structure mounting tool and a fixture engagement structure according to the present disclosure.

The surgical tool set for implant may further include an engagement structure mounting tool 300 that mounts the fixture engagement structure 60 in the fixture 30 positioned in a specific position of the implantation hole 56 illustrated in FIG. 10F.

The engagement structure mounting tool 300 may include a head 320 gripped by a practitioner, a rod 304 configured to penetrate the fixture engagement structure 60 under the head 302, and a fastening portion 306 that is disposed at an end of the rod 304 and is engaged with the inner fastening portion 80 of the fixture 30, when the fixture engagement structure 60 is mounted. In addition, the fastening portion 306 may be machined to be screwed with the hole 66 of the fixture engagement structure 60.

The fixture engagement structure 60 may include, in the engagement area section 64, the first engagement structure alignment portion 68 and the second engagement structure alignment portion 72, which have an actually same structure as the first supporting portion 112 and the second supporting portion 120 of the implantation driver 100.

The fixture engagement structure 60 will be described with reference to FIG. 11 and FIG. 12. FIG. 12 is a perspective view of fixture engagement structure.

The fixture engagement structure 60 may be one of various structures engaging with the fixture 30 that is disposed in an alveolar bone. For example, the fixture engagement structure 60 may include a superstructure for connecting a prosthesis to the fixture 30. The superstructure may include an abutment, a spacer, or any other gum penetrating component, which engage with a dental fixture to fill a gum covering maxilla or mandible. For example, a prosthesis like a crown, a bridge and a denture may be secured to the abutment.

In addition, the fixture engagement structure 60 may be a structure selected from a group consisting of, for example, a customized abutment, an abutment replica, an abutment blank, a scan abutment, a digital transfer coping, an impression pick-up element, and a healing cap.

The digital transfer coping may be scanned to have some distinct features indicative of rotational orientation and be connected to the fixture 30, and a digital file is transferred to an abutment maker. The digital file may contain information on the position and orientation of the fixture 30 as well as the position and orientation of a distinct feature.

In addition, the customized abutment may have a shape in the form of a tooth and neighboring tissues in a patient. In this case, the customized abutment is very useful, if a practitioner easily adjusts the customized abutment to a desired rational orientation. Apart from the customized abutment, a general abutment may also be rotationally oriented to the fixture 30 and a surrounding shape on purpose or may be formed in an asymmetric shape. For that, the fixture engagement structure 60 according to the present disclosure is embodied for exact alignment with the fixture 30. In the present disclosure, for the convenience of explanation, the fixture engagement structure 60 illustrated by the drawings will be described as an example of a general abutment or a customized abutment. However, the embodiments below are certainly applicable to the fixture engagement structure 60 with various structures that have specific forms customized to patients and thus need to be exactly aligned with a fixture.

The fixture engagement structure 60 may include an apical area section 62 coupled to a prosthesis, an engagement area section 64 providing a portion engaging with the fixture 30, and a hole 66 penetrating the area sections 62 and 64. The fixture engagement structure 60 may include the first engagement structure alignment portion 68, the second engagement structure alignment portion 72, which are disposed at the bottom of the engagement area section 64, and a gap portion 76, which is located between the engagement structure alignment portions 68 and 72, and a guide portion 78 provided under the alignment ports 68 and 72.

Similarly in FIG. 8 and FIG. 9, the first engagement structure alignment portion 68 may be radially arranged in the engagement area section 64 engaging with the fixture 30. A multiple number of the first engagement structure alignment portions 68 may be provided and be arranged at an equal interval along an outer circumference direction (D of FIG. 8 and FIG. 9) of the engagement area section 64. The first engagement structure alignment portion 68 may be machined to have a protruding shape in a radial direction (E of FIG. 8 and FIG. 9), that is, in the direction of radius tending outwards from a central axis of the fixture engagement structure 60. In this case, the gap portion 76 may be formed in a groove shape. As another example, the first engagement structure alignment portion 68 may be machined to have a groove shape in a radial direction. In this case, the gap portion 76 may be formed in a protruding shape. In this embodiment, for the convenience of explanation, the first engagement structure alignment portion 68 will be described to be formed in a protruding shape.

The first engagement structure alignment portion 68 may have a first engagement structure end portion 70 located at a side end facing the fixture 30. The first engagement structure end portion 70 may be formed to be tapered. A taper shape of the first engagement structure end portion 70 may be formed in a shape corresponding to a fixture end portion 54 disposed on top of a spacing portion 52 of the fixture 30. When the fixture engagement structure 60 rotates to align its position to the fixture 30, the first engagement structure end portion 70 and the fixture end portion 54 are in contact and friction. Thus, a practitioner may be able to rotate the fixture engagement structure 60 stably and easily.

The second engagement structure alignment portion 72 is arranged radially in the engagement area section 64 to be spacedly apart from the first engagement structure alignment portion 68 and may be arranged asymmetrically with respect to a center point located on a central axis of the fixture engagement structure 60. The second engagement structure alignment portion 72 may have a larger size than the first engagement structure alignment portion 68 in at least one of the outer circumference direction D and the radial direction E of the engagement area section 64. In addition, at least one second engagement structure alignment portion 72 may be formed, as illustrated in FIG. 8.

When the first engagement structure alignment portion 68 is formed to protrude, the second engagement structure alignment portion 72 may be machined to have a protruding shape in a radial direction. As another example, when the first engagement structure alignment portion 68 is formed as a groove, the second engagement structure alignment portion 74 may be machined to have a groove shape in the radial direction D. In this embodiment, for the convenience of explanation, the second engagement structure alignment portion 74 is described to be formed in a protruding shape.

When the first and second engagement structure alignment portions 68 and 74 with a similar structure to FIG. 8 are described as an example, the first engagement structure alignment portion 68 may be provided at an equal interval along the outer circumference direction D. In case the second engagement structure alignment portion 72 does not exist, the first engagement structure alignment portion 68 may be provided at 60 degrees interval so that the number of the first engagement structure alignment portions thus arranged becomes six. When the number of the first engagement structure alignment portions 68 thus arranged is four as shown in FIG. 8, the first engagement structure alignment portions 68 may be arranged at 180 degrees intervals so that two first engagement structure alignment portions face each other, or the first engagement structure alignment portions 68 may be arranged symmetrically with respect to a diameter direction according to a cross section of the fixture engagement structure 60. For quick and exact position alignment of one second engagement structure alignment portion 74 to the second fixture alignment portion 50 of the fixture 30 and for the convenience of machining, the second engagement structure alignment portion 74 may be formed to have a larger size than the first engagement structure alignment portion 68 along the outer circumference direction D. As an example, for the convenience of machining, convenient checking of misalignment with the fixture 30 and exact alignment, the second engagement structure alignment portion 72 according to the outer circumference direction D may be formed to be larger than a size of outer circumference virtually connecting the neighboring first engagement structure alignment portions 68. As another example, for convenient rotation and quick position alignment in case of misalignment with the fixture 30, the second engagement structure alignment portion 72 according to the outer circumference direction D may be formed to be smaller than a size of outer circumference virtually connecting the neighboring first engagement structure alignment portions 68. In this embodiment, the second engagement structure alignment portion 72 is described to have a larger size than the first engagement structure alignment portion 68 along the outer circumference direction D. However, as another example, the second engagement structure alignment portion 72 may be machined to have a larger size than the first engagement structure alignment portion 68 along the radial direction E. Hereinafter, for the convenience of explanation, an embodiment will be described regarding the second engagement structure alignment portion 72 having a large size in the direction of outer circumference D. In an embodiment of the second engagement structure alignment portion having a large size in the radial direction E, the second engagement structure alignment portion may also be formed to have a larger size than the first engagement structure alignment portion along the direction of outer circumference D.

The second engagement structure alignment portion 72 may be machined to be symmetric with respect to a diameter direction (or radial direction) of the fixture engagement structure 60 that passes through the second engagement structure alignment portion 72. However, the shape and arrangement of the second engagement structure alignment portion 72 may be formed to be asymmetric with respect to a center point. Specifically, an outer circumference of the second engagement structure alignment portion 72 along the outer circumference direction D may be extended within a range that is asymmetric with respect to the center point. When the outer circumference of the second engagement structure alignment portion 72 is extended to a range that is symmetric with respect to the center point, the number of the first engagement structure alignment portions 68 may be excessively reduced. Thus, while the fixture engagement structure 60 rotates in the fixture 30, the first engagement structure alignment portion 68 may be inserted deep into the second fixture alignment portion 50 of the fixture 30, thereby causing difficulty in additional rotation for expected position alignment.

In addition, similarly in FIG. 8, the second engagement structure alignment portion 72 may be arranged asymmetrically with every first engagement structure alignment portion 68 with respect to the center point. Accordingly, an abutment, which is fabricated by a manufacturer to have a predetermined specific position or rotational orientation, may be exactly arranged and engage with the fixture 30 in accordance with the manufacturer's intent.

In an embodiment of the second engagement structure alignment portion having a large size in the radial direction E, the second engagement structure alignment portion itself may be formed to be asymmetric with respect to the center point, similar to what is described above, and may be arranged asymmetrically with every first engagement structure alignment portion with respect to the center point.

The second engagement structure alignment portion 72 may have the second engagement structure end portion 74 located at a side end facing the fixture 30. The second engagement structure end portion 74 may be formed to be tapered. A taper shape of the second engagement structure end portion 74 may be formed in a shape corresponding to the fixture end portion 54 and the first engagement structure end portion 70. When the fixture engagement structure 60 rotates to align its position to the fixture 30, the first and second engagement structure end portions 70 and 74 and the fixture end portion 54 are in contact and friction. Thus, a practitioner may be able to rotate the fixture engagement structure 60 stably and easily.

In addition, the first and second engagement structure end portions 70 and 74 may be machined to have a same level in a longitudinal direction along a central axis in order to prevent the disadvantage described below. In case the first engagement structure end portion 70 is extended further than the second engagement structure end portion 74 in a direction toward the bottom of the engagement area section 64, when the fixture engagement structure 60 enters into the fixture 30, the first engagement structure alignment portion 68 may be inserted into the second fixture alignment portion 50. Thus, the fixture engagement structure 60 may be misaligned in an inaccurate position of the fixture 30, and additional rotation may not be easy.

Similarly in FIG. 9, a plurality of second engagement structure alignment portions may be arranged. For specific position alignment between the fixture engagement structure 60 and the fixture 30, for example, one unique position or rotational orientation designated by a manufacturer, like in FIG. 9, the two second engagement structure alignment portions may be arranged to be asymmetric with each other with respect to the center point. In case the second engagement structure alignment portions and the second fixture alignment portions are symmetric with respect to the center point, even when one unique position is determined by a manufacturer's asymmetric machining of the apical area section 62, an error may occur in which the second engagement structure alignment portions and the second fixture alignment portions are coupled in a position or orientation that is not intended by the manufacturer. Accordingly, in order to prevent the error, multiple second engagement structure alignment portions and multiple second fixture alignment portions may be arranged to be asymmetric with respect to the center point.

In addition, similarly in FIG. 9, the second engagement structure alignment portions may be arranged following the first engagement structure alignment portions that are successively arranged. As another example, the second engagement structure alignment portions may be arranged at least one by one alternately between the first engagement structure alignment portions. Alternatively, a random number of the second engagement structure alignment portions may be arranged between the first engagement structure alignment portions. In order to align and engage an abutment, which is fabricated to have a unique position or rotational orientation, exactly with the fixture 30, the second engagement structure alignment portions in the above cases may be arranged asymmetrically with every first engagement structure alignment portion.

In an embodiment of a second engagement structure alignment portion having a large size in the radial direction E, second engagement structure alignment portions may also be arranged in a multiple number, and the above description regarding an embodiment according to the outer circumference direction D may be similarly applied.

In order to make the fixture engagement structure 60 easily enter into an open end of the first area section 32 of the fixture 30 and to make the engagement structure alignment portions 68 and 72 stably settle in the fixture end 54, the guide portion 78 may be provided at the bottom end of the engagement area section 64 and, when engaging with the fixture 30, may be arranged closer to the fixture 30 than to the first and second engagement structure alignment portions 68 and 72. The guide portion 78 may be fabricated to have a diameter very close to a side wall of the spacing portion 52 located between the first and second fixture alignment portions 48 and 50. Accordingly, for example, even when misalignment between the first engagement structure alignment portion 68 and the second fixture alignment portion 50 causes the first engagement structure alignment portion 68 to be located in an inaccurate position like the second fixture alignment portion 50, the guide portion 78 and the spacing portion 52 adhere to each other so that the first engagement structure alignment portion 68 may not be inserted deep into the second fixture alignment portion 50. Thus, it is possible to easily implement additional rotation of the fixture engagement structure 60 for exact position alignment on the fixture 30.

The above-described embodiment for the fixture engagement structure 60 shows an example of arranging the first engagement structure alignment portions 68 at 60 degree interval, but is not limited thereto. For example, the first engagement structure alignment portions 68 may be arranged at an equal interval of 90 degrees and may be arranged at an equal interval of 45 degrees.

Figure 13A:
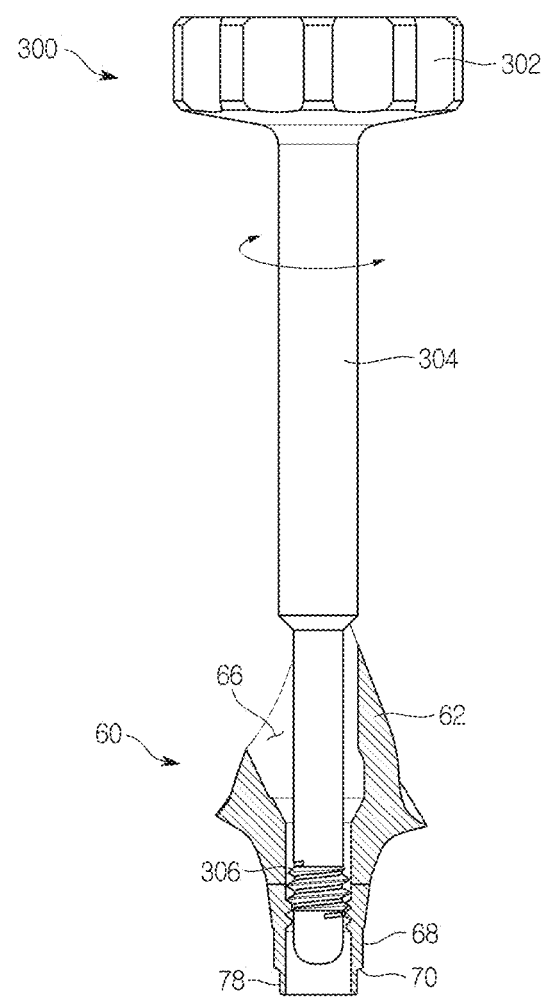
FIGS. 13A to 13E are views illustrating a process of engaging a fixture engagement structure with a fixture by using an engagement structure mounting tool according to the present disclosure.
Figure 13B:
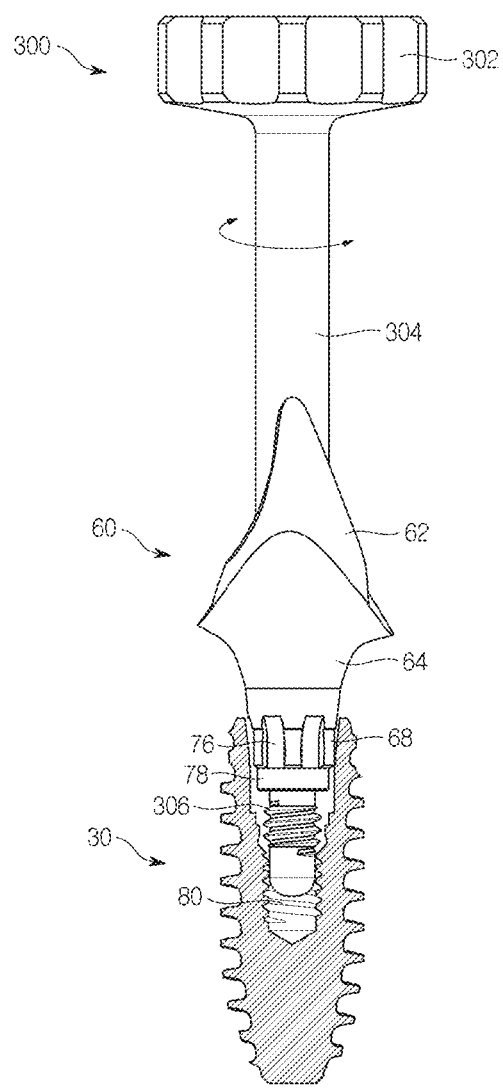

Hereinafter, referring to FIGS. 13A to 13E, an operation of engaging the fixture engagement structure 60 with the fixture 30 by means of the engagement structure mounting tool 300 will be described. FIGS. 13A to 13B are views illustrating a process of engaging a fixture engagement structure with a fixture by using an engagement structure mounting tool according to the present disclosure. It is illustrated that the fixture engagement structure 60 is a general-type or customized abutment and the engagement structure mounting tool 300 is an abutment jig.

Referring to FIG. 13A, a practitioner may screw the fastening portion 306 to a thread machined in the hole 66 by inserting the rod 304 of the engagement structure mounting tool 300 into the hole 66 of the fixture engagement structure 60 and then may move the engagement structure mounting tool 300 so that the fastening portion 306 passes through the thread of the hole 66.

Referring to FIG. 13B, the practitioner may insert the engagement structure mounting tool 300, on which the fixture engagement structure 60 has been mounted, into the receiving portion 46 of the fixture 30 that is inserted into the implantation hole 56. In addition, the practitioner may insert the rod 304 further into the receiving portion 46 until the fastening portion 306 reaches the inner fastening portion 80.

Figure 13C:
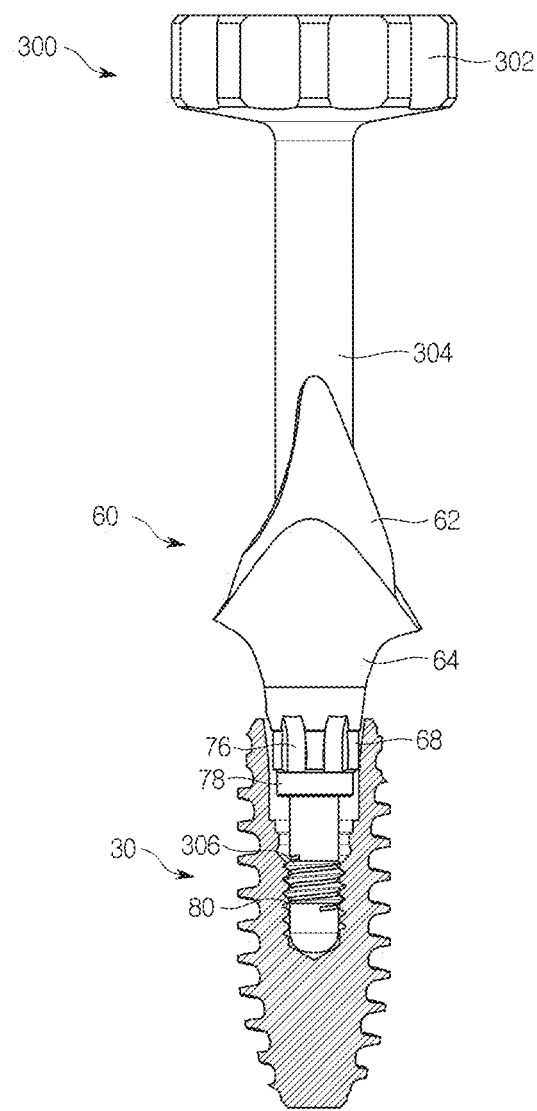

Referring to FIG. 13C, the practitioner may screw the fastening portion 306 to the inner fastening portion 80 by rotating the engagement structure mounting tool 300. Thus, the fixture engagement structure 60 may be arranged stably on the fixture 30, thereby being smoothly rotated.

Figure 13D:
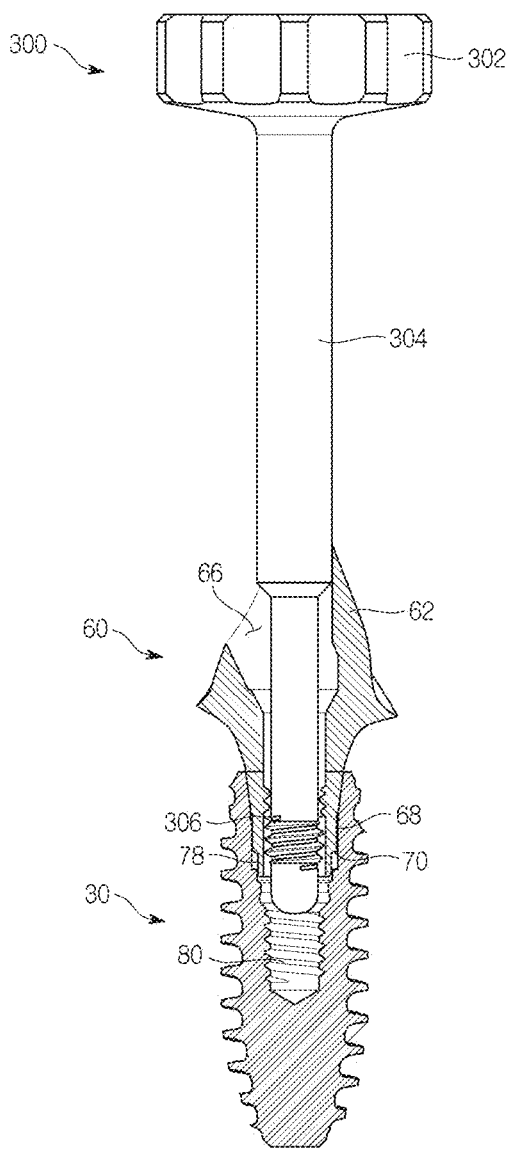

Referring to FIG. 13D, by rotating the fixture engagement structure 60 supported by the engagement structure mounting tool 300, the practitioner may locate the first and second engagement structure alignment portions 68 and 72 on the first and second fixture alignment portions 48 and 50. As a unique engagement position between the fixture engagement structure 60 and the fixture 30 is quickly recognized through the engagement structure mounting tool 300, the practitioner may align the fixture engagement structure 60 to the fixture 30 in a rotational orientation required by the surgery simulation program.

Figure 13E:
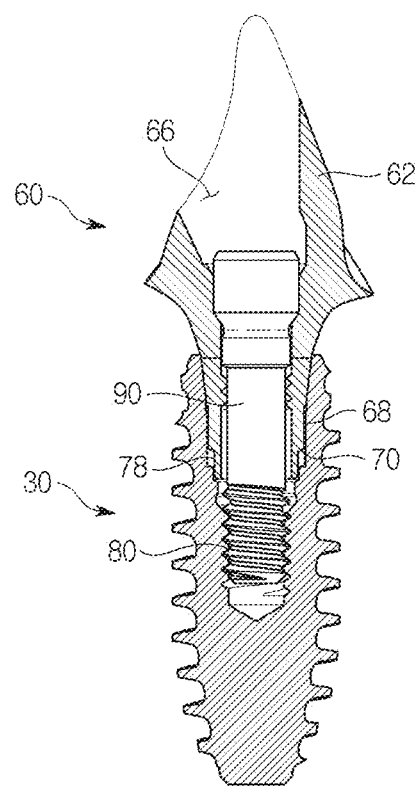

After the alignment is completed, the practitioner may withdraw the engagement structure mounting tool 300 from the fixture engagement structure 60 and, as illustrated in FIG. 13E, may insert the screw 90 through the hole 66 of the fixture engagement structure 60 and couple the screw 90 to the inner fastening portion 80 of the fixture 30.

Although the present invention has been described in detail through the representative embodiments above, it will be understood by those skilled in the art that various modifications can be made without departing from the scope of the present invention with respect to the above-described embodiments. Therefore, the scope of the present invention should not be limited to the embodiments described, but should be defined by all changes or modifications derived from the claims and the equivalent concepts thereto.

What is claimed is:

1. A surgical tool set having an implantation driver for implanting a fixture, the implantation driver comprising:
    an engager configured to transmit implantation torque to the fixture;
    a first support protruding radially from the engager;
    at least one second support protruding radially from the engager so as to be spacedly apart from the first support and being arranged asymmetrically with respect to a center point located on a central axis of the implantation driver; and
    a recognizer, comprising a position identifier and a plurality of dummy members spaced apart from the position of the identifier,
    wherein a dummy gap member is disposed between the plurality of dummy members and positioned on a same plane,
    wherein the recognizer is disposed separate from the engager and configured to identify at least one of an alignment position of the fixture or an alignment direction of the fixture, and
    wherein the at least one second support has a larger size than the first support along an outer circumference direction and a radial direction of the engager.

2. The surgical tool set of claim 1, wherein, when the first support comprises a plurality of the first supports, the plurality of first supports are disposed at an equal interval along the outer circumference direction and the at least one second support is disposed between the plurality of first supports, a size of an outer circumference of the at least one second support is larger a size of outer circumference connecting two of the plurality of first supports that are adjacent to each other.

3. The surgical tool set of claim 1, wherein the first support comprises a first supporting end facing the fixture, and the at least one second support comprises a second supporting end facing the fixture, and the first and second supporting ends have a same level.

4. The surgical tool set of claim 1, wherein the position identifier is arranged to correspond to the at least one second support and identifies at least one of the alignment position or the alignment direction, and the plurality of dummy members are disposed spacedly from the position identifier, and
    wherein the position identifier has a larger size than the dummy members along at least one of an outer circumference direction or a radial direction of the recognizer.

5. The surgical tool set of claim 4, further comprising a sleeve configured to support the fixture and guide the fixture to a jawbone, when the fixture is being implanted,
    wherein the sleeve comprises:
        a body portion that the fixture penetrates; and
        an alignment marker that is disposed around the body portion and provides a reference point for at least one of the alignment position or the alignment direction,
    and wherein the recognizer comprises:
        an alignment identifier that is disposed between one side of the position identifier and the dummy member and has a check area, in which the alignment marker is recognizable when the fixture is implanted using the implantation driver; and
        an auxiliary identifier, disposed between the other side of the position identifier and the dummy member, having a smaller size than the check area of the alignment identifier.

6. The surgical tool set claim 5, wherein the sleeve has connectors that are disposed around the body portion to be mounted into a guide hole of a guide device exposing an implantation position of the fixture during the implantation, and
    wherein the alignment marker is provided to one of the plurality of connectors.

7. The surgical tool set of claim 6, wherein a connector of the connectors, to which the alignment marker is provided, is mounted into an end of the guide hole corresponding to an outer gum.

8. The surgical tool set of claim 5, wherein the alignment identifier is larger in size than the dummy gap member along the outer circumference direction of the recognizer.

9. The surgical tool set of claim 1, further comprising an engagement structure mounting tool configured to mount a fixture engagement structure on the implanted fixture,
    wherein the engagement structure mounting tool comprises:
        a rod configured to penetrate the fixture engagement structure; and
        a fastener that is disposed at an end of the rod and is combined with an inner fastener of the fixture when the fixture engagement structure is mounted.

10. The surgical tool set of claim 9, wherein the fixture comprises a first fixture aligner and a second fixture aligner that have a structure for engaging with the first support and the at least one second support in an area section corresponding to the engager, and
    wherein the fixture engagement structure comprises, in the engagement area section, a first engagement structure aligner and a second engagement structure aligner that have a same structure as the first support and the at least one second support.

11. The surgical tool set of claim 1, wherein the dummy gap member is a groove extending vertically on the recognizer.

* * * * *